United States Patent
Ogino

(10) Patent No.: US 12,159,484 B2
(45) Date of Patent: Dec. 3, 2024

(54) PHOTOGRAPHING SYSTEM, PHOTOGRAPHING METHOD, AND NON-TRANSITORY COMPUTER-READABLE MEDIUM STORING PHOTOGRAPHING PROGRAM

(71) Applicant: NEC Corporation, Tokyo (JP)

(72) Inventor: Yuka Ogino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 137 days.

(21) Appl. No.: 17/912,956

(22) PCT Filed: Mar. 30, 2020

(86) PCT No.: PCT/JP2020/014596
§ 371 (c)(1),
(2) Date: Sep. 20, 2022

(87) PCT Pub. No.: WO2021/199168
PCT Pub. Date: Oct. 7, 2021

(65) Prior Publication Data
US 2023/0169793 A1  Jun. 1, 2023

(51) Int. Cl.
*G06V 40/18* (2022.01)
*G06T 7/50* (2017.01)
(Continued)

(52) U.S. Cl.
CPC .............. *G06V 40/18* (2022.01); *G06T 7/50* (2017.01); *G06T 7/70* (2017.01); *G06V 10/25* (2022.01);
(Continued)

(58) Field of Classification Search
None
See application file for complete search history.

(56) References Cited

U.S. PATENT DOCUMENTS 10,682,038 B1 *  6/2020  Zhang .................... B25J 13/00
2002/0191076 A1   12/2002  Wada et al.
(Continued)

FOREIGN PATENT DOCUMENTS

JP    H11-327038 A    11/1999
JP    2002-125142 A    4/2002
(Continued)

OTHER PUBLICATIONS

International Search Report for PCT Application No. PCT/JP2020/014596, mailed on Jun. 23, 2020.
(Continued)

*Primary Examiner* — Edemio Navas, Jr.

(57) ABSTRACT

An imaging system includes: an acquisition unit acquiring an iris image captured by an iris imaging means for capturing an iris of a target person or a whole image captured by a whole imaging means for capturing the target person; an estimation unit estimating a three-dimensional position of a target person being included in the acquired whole image; a selection unit selecting a coordinate transformation matrix that transforms a three-dimensional position of the target person into two-dimensional coordinates; a transformation unit transforming coordinates of an eye of a target person being included in a whole image associated with the estimated three-dimensional position into two-dimensional coordinates, based on the selected coordinate transformation matrix; and a setting unit setting, based on the transformed coordinates of an eye of the target person, a parameter for capturing an iris of the target person by the iris imaging means.

15 Claims, 16 Drawing Sheets

(51) Int. Cl.
*G06T 7/70* (2017.01)
*G06V 10/25* (2022.01)
*H04N 23/67* (2023.01)

(52) U.S. Cl.
CPC . *H04N 23/675* (2023.01); *G06T 2207/30201* (2013.01)

(56) References Cited

U.S. PATENT DOCUMENTS

| | | | |
|---|---|---|---|
| 2003/0021598 A1* | 1/2003 | Higashiyama | G07C 9/37 396/18 |
| 2003/0219247 A1* | 11/2003 | Doi | A61B 3/14 396/429 |
| 2004/0202353 A1* | 10/2004 | Doi | G08B 13/19613 382/115 |
| 2005/0084179 A1 | 4/2005 | Hanna et al. | |
| 2014/0098198 A1* | 4/2014 | Lee | G06F 3/013 348/48 |
| 2016/0088218 A1 | 3/2016 | Kikuchi et al. | |
| 2016/0092743 A1* | 3/2016 | Lee | G02B 27/01 348/78 |
| 2022/0410375 A1* | 12/2022 | Tsuboi | G01B 11/005 |

FOREIGN PATENT DOCUMENTS

| | | |
|---|---|---|
| JP | 2004-287621 A | 10/2004 |
| JP | 2007-504562 A | 3/2007 |
| WO | 2009/016846 A1 | 2/2009 |
| WO | 2014/208488 A1 | 12/2014 |

OTHER PUBLICATIONS

Watanabe Takahiro et al., "Personal Identification System Based on Automatic Iris Pattern Capturing", ITE Technical Report, Mar. 21, 2001, vol. 25, No. 29, pp. 43-48, ISSN: 1342-6893.

* cited by examiner

PHOTOGRAPHING SYSTEM, PHOTOGRAPHING METHOD, AND NON-TRANSITORY COMPUTER-READABLE MEDIUM STORING PHOTOGRAPHING PROGRAM

This application is a National Stage Entry of PCT/JP2020/014596 filed on Mar. 30, 2020, the contents of all of which are incorporated herein by reference, in their entirety.

TECHNICAL FIELD

This disclosure relates to an imaging system, an imaging method, and a non-transitory computer-readable medium that stores an imaging program.

BACKGROUND ART

Iris authentication using an iris of an eye has been known as one biometric authentication. In the iris authentication, an iris of a target person is captured by using an imaging system, and registration and authentication of the target person are performed based on the captured iris image. In such an imaging system, an iris camera for capturing an image of an iris of a target person and a camera for capturing an image of the target person in an area wider than that of the iris camera are used.

For example, Patent Literatures 1 and 2 have been known as related techniques. Patent Literature 1 describes that a height and a position of a face of a target person are extracted by using a face camera, and an eye of the target person is captured by an iris camera, based on the extracted information. Further, Patent Literature 2 describes that a whole face and eyes of a target person are captured by moving a camera without providing two cameras. In addition, Patent Literature 3 has been known as a technique related to a focus adjustment of a camera.

CITATION LIST

Patent Literature

[Patent Literature 1] International Patent Publication No. WO2009/016846
[Patent Literature 2] Japanese Unexamined Patent Application Publication No. 2004-287621
[Patent Literature 3] International Patent Publication No. WO2014/208488

SUMMARY OF INVENTION

Technical Problem

In the imaging system as described above, it is required that an iris camera appropriately captures a region including an eye of a target person.

An object of this disclosure is to provide an imaging system, an imaging method, and a non-transitory computer-readable medium that stores an imaging program, for solving the problem described above.

Solution to Problem

An imaging system according to this disclosure includes: an acquisition means for acquiring an iris image captured by an iris imaging means for capturing an iris of a target person at a first angle of view or a whole image captured by a whole imaging means for capturing the target person at a second angle of view wider than the iris imaging means; an estimation means for estimating a three-dimensional position of a target person being included in the acquired whole image; a selection means for selecting a coordinate transformation matrix that transforms a three-dimensional position of the target person into two-dimensional coordinates at the first angle of view; a transformation means for transforming coordinates of an eye of a target person being included in a whole image associated with the estimated three-dimensional position into two-dimensional coordinates at the first angle of view, based on the selected coordinate transformation matrix; and a setting means for setting, based on the transformed coordinates of an eye of the target person, a parameter for capturing an image of an iris of the target person by the iris imaging means.

An imaging method according to this disclosure includes: acquiring an iris image captured by an iris imaging means for capturing an iris of a target person at a first angle of view or a whole image captured by a whole imaging means for capturing the target person at a second angle of view wider than the iris imaging means; estimating a three-dimensional position of a target person being included in the acquired whole image; selecting a coordinate transformation matrix that transforms a three-dimensional position of the target person into two-dimensional coordinates at the first angle of view; transforming coordinates of an eye of a target person being included in a whole image associated with the estimated three-dimensional position into two-dimensional coordinates at the first angle of view, based on the selected coordinate transformation matrix; and setting, based on the transformed coordinates of an eye of the target person, a parameter for capturing an image of an iris of the target person by the iris imaging means.

A non-transitory computer-readable medium configured to store an imaging program according to this disclosure is a non-transitory computer-readable medium configured to store an imaging program for causing a computer to execute processing of: acquiring an iris image captured by an iris imaging means for capturing an iris of a target person at a first angle of view or a whole image captured by a whole imaging means for capturing the target person at a second angle of view wider than the iris imaging means; estimating a three-dimensional position of a target person being included in the acquired whole image; selecting a coordinate transformation matrix that transforms a three-dimensional position of the target person into two-dimensional coordinates at the first angle of view; transforming coordinates of an eye of a target person being included in a whole image associated with the estimated three-dimensional position into two-dimensional coordinates at the first angle of view, based on the selected coordinate transformation matrix; and setting, based on the transformed coordinates of an eye of the target person, a parameter for capturing an image of an iris of the target person by the iris imaging means.

EXAMPLE EMBODIMENT

Example embodiments will be described below with reference to the drawings. For clarification of the description, the description and the drawings below are appropriately omitted and simplified. In each of the drawings, the same elements will be denoted by the same reference signs, and duplicate description will be omitted as necessary.

Basic Configuration of Example Embodiment

Figure 1:
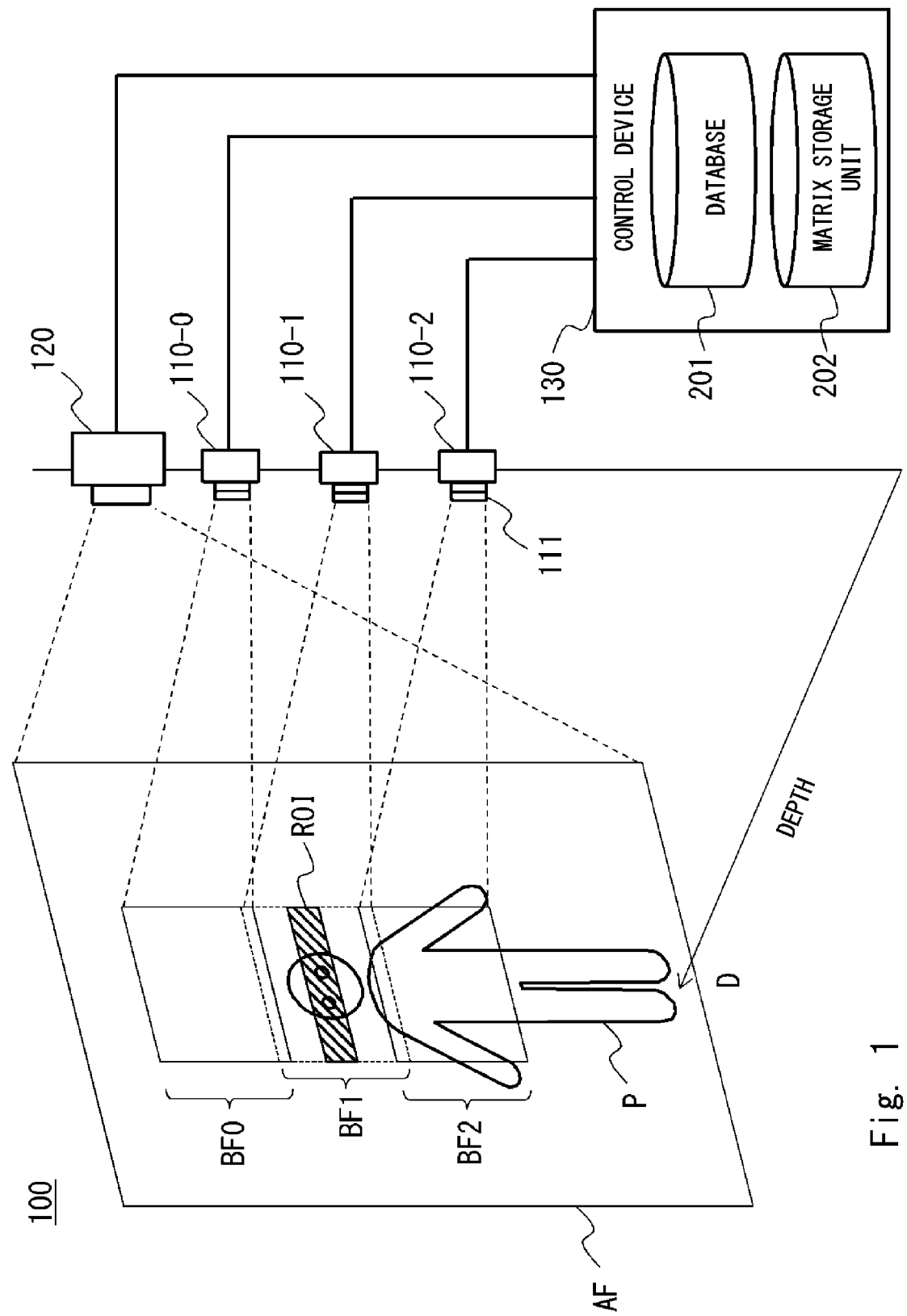
FIG. 1 is a configuration diagram illustrating a configuration example of an imaging system according to a basic configuration of an example embodiment.

First, a basic configuration to which an example embodiment is applied will be described. FIG. 1 illustrates a configuration example of an imaging system 100 according to the basic configuration. The imaging system 100 is a living body registration authentication system that captures a living body (a part of a body that can be captured, such as an iris, a retina, eyelashes, a fingerprint, and an ear) of a target person P, and performing registration processing and authentication processing of the target person P, based on a captured living body image. Note that the imaging system 100 may perform both or only one of the registration processing and the authentication processing. In the following example embodiment, a form using irises as a living body will be described.

As illustrated in FIG. 1, the imaging system 100 includes a plurality of iris cameras 110, a wide field of view (WFOV) camera 120, and a control device 130. Note that, although not illustrated, the imaging system 100 further includes an illumination means such as a light emitting diode (LED) that irradiates irises of the target person P with illumination light. The illumination means irradiates the target person P with illumination light in response to control from the control device 130 when the iris camera 110 captures the target person P.

The iris camera 110 is an iris imaging device for capturing the irises of the target person P. A resolution of the iris camera 110 is a resolution with which an iris pattern of the target person P can be extracted, and an angle of view BF of the iris camera 110 is an angle of view including at least both eyes of the target person P. Note that the angle of view is a capturing area (visual field area) of a camera at a capturing point (position of a capturing target). The iris camera 110 is formed of a general-purpose camera of 12 M pixels (horizontal 4000 pixels, vertical 3000 pixels) and 60 fps, which is becoming a diffused product, such as an industrial camera, for example. A distance from a camera (the iris camera or the wide field of view camera) to a capturing point is referred to as a depth, and, in this example, the iris camera 110 captures the target person P in a position at a depth D.

A position (height) of eyes of the target person P varies depending on a height of the target person P. Thus, for example, the plurality of iris cameras 110 are aligned in a vertical direction by height of the target person P. In this example, three iris cameras 110-0 to 110-2 are disposed, but the number is not limited to three, and any number of the iris cameras 110 may be disposed. For example, the number of iris cameras is set according to an angle of view, a resolution, and the like of the iris camera 110. Further, a region where irises cannot be captured is generated when angles of view of the plurality of iris cameras 110 are separated, and thus the iris cameras 110-0 to 110-2 are disposed in such a way that the angles of view BF partially overlap each other between adjacent iris cameras.

The iris camera 110 that may capture eyes of the target person P is selected from the iris cameras 110-0 to 110-2 by the control device 130, and an image (iris camera image) captured by the selected iris camera 110 is output to the control device 130. Herein, a capturing method of capturing the irises of the target person P by a camera selected from among the plurality of iris cameras 110 will be described, but a similar capturing method may be achieved by moving one iris camera 110 in the vertical direction. For example, a camera may be disposed in a position of the iris camera 110-0 in an initial state, and the camera may be moved in the vertical direction according to a position of the irises of the target person P during iris capturing. Note that an image captured by the iris camera 110 may be referred to as an iris camera image and an image focusing on irises of the iris camera image may be referred to as an iris image, but the iris camera image and the iris image can replace each other unless otherwise specified.

A region of interest (ROI) can be set in the angle of view BF, and the iris camera 110 captures an image in an area of the set ROI. Since both eyes of a person are aligned in a horizontal direction, the ROI is a rectangular region extending in the horizontal direction as a longitudinal direction in such a way as to be able to capture both eyes. In other words, the ROI is a region (iris imaging region) for capturing both eyes of the target person P within an angle of view of the iris camera 110. A size of the ROI is predetermined. For example, a length (width) of the ROI in the horizontal direction is the same as a length of the angle of view BF in the horizontal direction, and a length (height) of the ROI in the vertical direction is shorter than a length of the angle of view BF in the vertical direction (for example, about half of the angle of view BF). The ROI is set by setting a position (height) at the angle of view BF in the vertical direction.

Further, a variable focus lens 111 is attached to each of the iris cameras 110. The variable focus lens 111 is, for example, a liquid lens, but may be another lens that can control a focal position. The liquid lens uses a change in curvature of a droplet by an input voltage, and can focus on a different depth position by changing an image formation position of an incident image on a lens. Focus scanning that scans a focal position can be performed by moving, in a front-rear direction of an optical axis, a focal position of the variable focus lens 111 in response to control from the control device 130. For example, a depth of field (focusing range) of the iris camera 110 is about 1 cm and narrow. Thus, by performing burst imaging (continuous imaging) that captures a certain number of images at a high frame rate while performing focus scanning by the variable focus lens 111, an iris image focusing on irises can be extracted from among iris camera images acquired by performing continuous capturing in a predetermined wide range (scanning range).

The wide field of view camera 120 is a whole imaging device for capturing (commanding a wide field of view of) the target person P in an area wider than that of the iris camera 110. A resolution of the wide field of view camera 120 is a resolution that can recognize a face and eyes of the target person P. An angle of view AF of the wide field of view camera 120 is an angle of view (for example, including the angle of view BF of all of the iris cameras 110) in an area wider than that of the angle of view BF of the plurality of iris cameras 110, and is an angle of view that can cover an entire area from a tall target person to a short target person.

For example, the wide field of view camera 120 is disposed above the iris cameras 110-0 to 110-2 aligned in the vertical direction, but an arrangement position is not limited, and the wide field of view camera 120 may be disposed below the iris cameras 110-0 to 110-2. The wide field of view camera 120 outputs an image (wide field of view image) captured at the angle of view AF to the control device 130.

The control device 130 is a control device that controls imaging of the plurality of iris cameras 110-0 to 110-2, based on a wide field of view image captured by the wide field of view camera 120. Further, the control device 130 is also a registration authentication device that performs registration processing and authentication processing of the target person P, based on an iris image.

The control device 130 includes a storage means for storing data needed for processing of the control device 130. For example, the storage means includes a database 201 and a matrix storage unit 202. The database 201 and the matrix storage unit 202 are a non-volatile memory such as a flash memory, a hard disk device, and the like, and may be included inside the control device 130 or may be included outside the control device 130. The database 201 is a database that registers iris information based on an iris image of a target person in order to authenticate the target person. The matrix storage unit 202 stores a coordinate transformation matrix for transforming coordinates (two-dimensional coordinates) of the angle of view AF of the wide field of view camera 120 into coordinates (two-dimensional coordinates) of the angle of view BF of the iris camera 110. It can also be said that the coordinate transformation matrix is a transformation matrix that transforms a camera parameter of the wide field of view camera 120 into a camera parameter of the iris camera 110.

Figure 2:
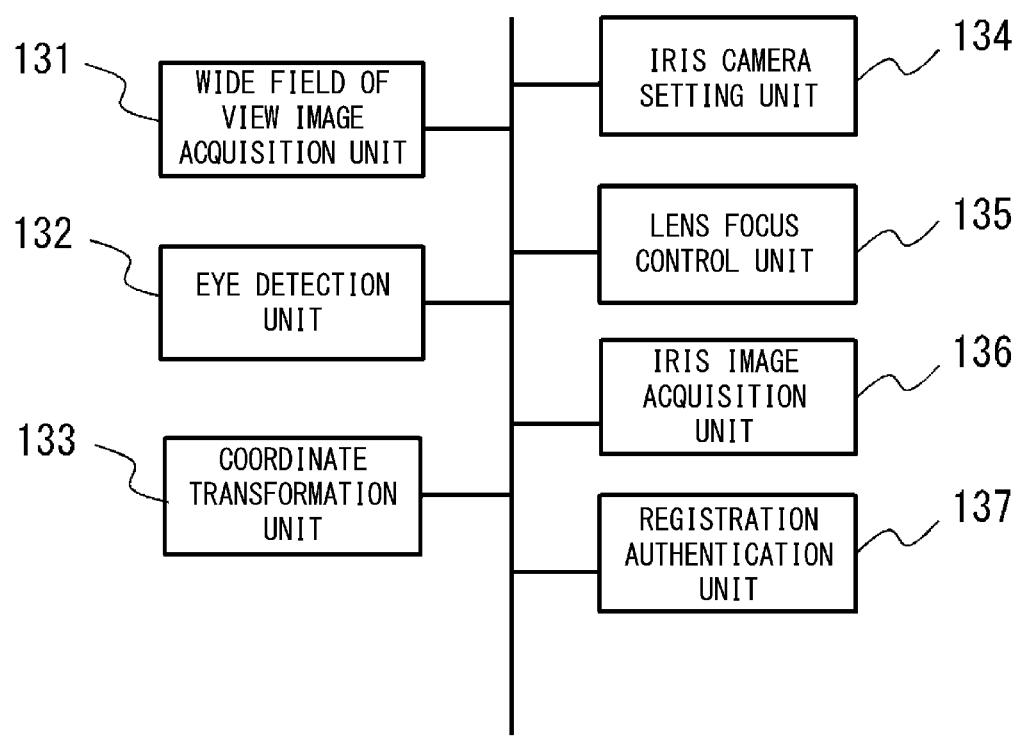
FIG. 2 is a configuration diagram illustrating a configuration example of a control device according to the basic configuration of the example embodiment.

FIG. 2 illustrates a configuration example of the control device according to the basic configuration. As illustrated in FIG. 2, the control device 130 includes a wide field of view image acquisition unit 131, an eye detection unit 132, a coordinate transformation unit 133, an iris camera setting unit 134, a lens focus control unit 135, an iris image acquisition unit 136, and a registration authentication unit 137. The control device 130 is achieved by a computer device such as a server and a personal computer, for example, but may be achieved by one device or may be achieved by a plurality of devices. For example, the registration authentication unit 137 and the like may be set as a device different from the control device 130.

The wide field of view image acquisition unit 131 acquires a wide field of view image (wide field of view video) in which the wide field of view camera 120 captures the target person P. It can also be said that the wide field of view image acquisition unit 131 is a capturing unit that acquires an image (video) captured in an area of the angle of view AF by the wide field of view camera 120.

The eye detection unit 132 detects a region of eyes of the target person P from the wide field of view image being acquired by the wide field of view image acquisition unit 131. The eye detection unit 132 may directly detect a region of eyes from a wide field of view image, or may detect a region of a face from a wide field of view image and detect a region of eyes from the detected region of the face. For example, the eye detection unit 132 recognizes a pattern of a face from an image, extracts a region of the face, recognizes a pattern of an eye (iris) from the image, and extracts a region of the eye (iris).

The coordinate transformation unit 133 calculates coordinates, at the angle of view BF of the iris camera 110, of the region of the eyes being detected by the eye detection unit 132, based on a correspondence in angle of view (camera parameter) between the wide field of view camera 120 and the iris camera 110. The coordinate transformation unit 133 transforms the coordinates of the detected eyes in the wide field of view image (angle of view AF) into coordinates in an iris camera image (angle of view BF) of the iris camera 110 by using the coordinate transformation matrix of the matrix storage unit 202.

The iris camera setting unit 134 performs setting needed for capturing the irises of the target person P on any of the plurality of iris cameras 110, based on the coordinates of the region of the eyes at the angle of view BF of the iris camera 110 being calculated by the coordinate transformation unit 133. The iris camera setting unit 134 selects the iris camera 110 suitable for capturing the irises of the target person P according to a position of the eyes at the angle of view BF, and also sets the ROI within the angle of view BF of the selected iris camera 110. In other words, the iris camera setting unit 134 is also a selection unit that selects the iris camera 110 that captures the irises of the target person P.

The lens focus control unit 135 drives the variable focus lens 111 of the iris camera 110 selected by the iris camera setting unit 134, and performs control in such a way that a focal position of the iris camera 110 moves in a predetermined scanning range.

The iris image acquisition unit 136 acquires an iris camera image (iris image) captured by the iris camera 110 being selected and set by the iris camera setting unit 134. The iris camera 110 performs the burst imaging on the ROI by focus scanning of the variable focus lens 111, and the iris image acquisition unit 136 acquires a plurality of iris camera images acquired by performing the burst imaging. Further, an iris image focusing on the irises is extracted from iris camera images. It can also be said that the iris image acquisition unit 136 is a capturing unit that acquires an image captured in an area of the ROI by the iris camera 110.

The registration authentication unit 137 performs registration processing and authentication processing of the target person P by using the iris image acquired by the iris image acquisition unit 136. For example, the registration authentication unit 137 registers, in the database 201, iris information based on the iris image acquired by the iris image acquisition unit 136. Further, the registration authentication unit 137 performs authentication of the target person by comparing iris information based on the iris image acquired by the iris image acquisition unit 136 with iris information registered in the database 201.

Figure 3:
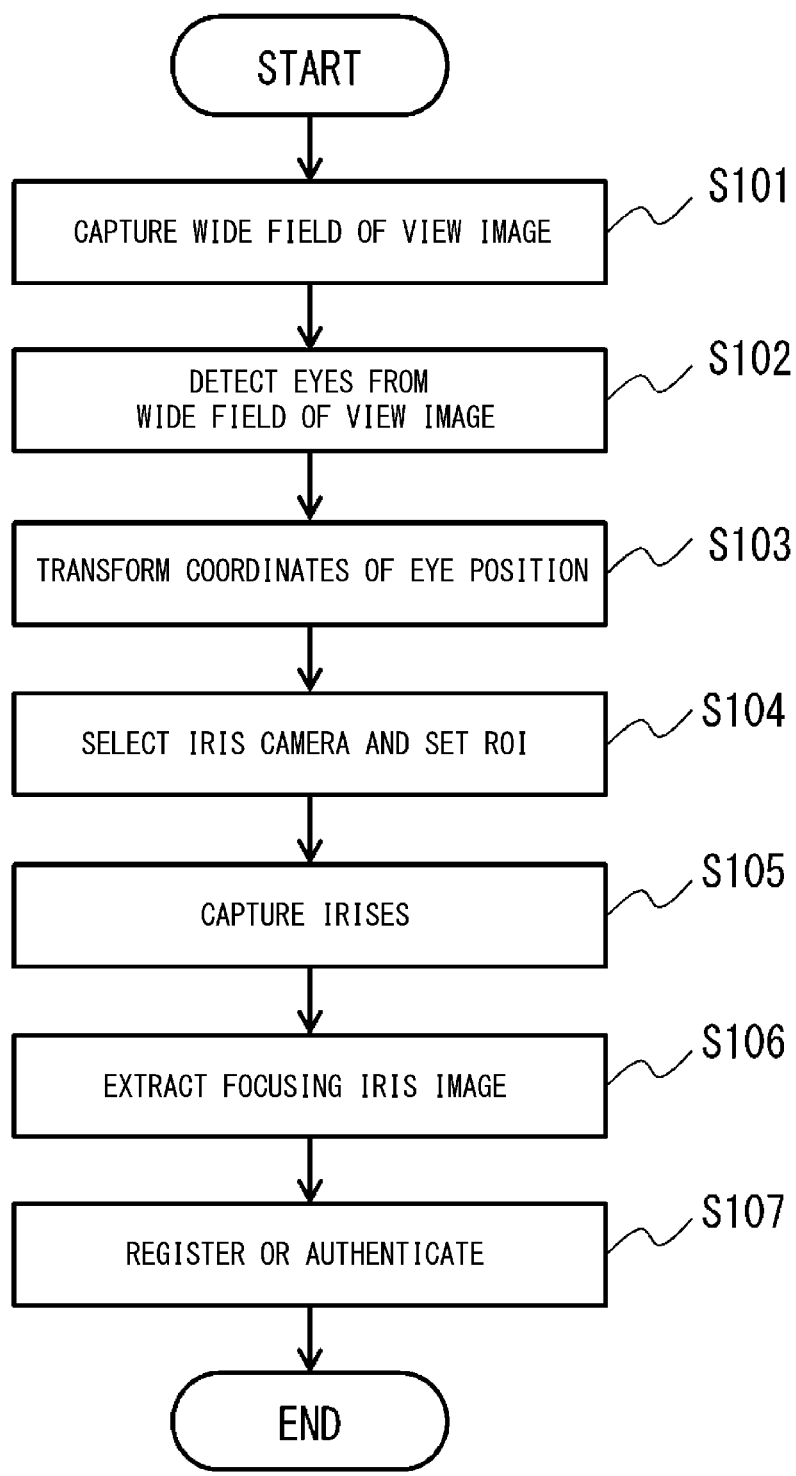
FIG. 3 is a flowchart illustrating an operation example of the imaging system according to the basic configuration of the example embodiment.

FIG. 3 illustrates an operation example of the imaging system according to the basic configuration. As illustrated in FIG. 3, first, the wide field of view camera 120 captures a wide field of view image including the target person P (S101). For example, while the target person P stands in a predetermined position (depth D), the wide field of view camera 120 performs capturing at the angle of view AF, and outputs a captured wide field of view image including the target person P to the control device 130.

Then, the control device 130 detects a position of eyes of the target person P from the captured wide field of view image (S102). When the wide field of view image is acquired from the wide field of view camera 120, the eye detection unit 132 detects the eyes of the target person P in the wide field of view image. For example, when a face is detected, the eye detection unit 132 detects a region of the face by extracting an edge (contour) from a wide field of view image, and matching an image pattern of a region surrounded by the extracted edge with a predetermined image pattern of the face. Furthermore, the eye detection unit 132 extracts a pattern of eyes (irises) from an image of a region of a face or a wide field of view image. For example, processing of extracting a circular pattern from a target image is performed, and a position of the extracted circle is detected as a position of an eye (iris).

Then, the control device 130 transforms coordinates of the detected position of the eyes (S103). When the eyes of the target person P are detected from the wide field of view image, the coordinate transformation unit 133 transforms coordinates of the eyes in the wide field of view image into coordinates in an iris camera image (angle of view BF) of the iris camera 110.

Figure 4:
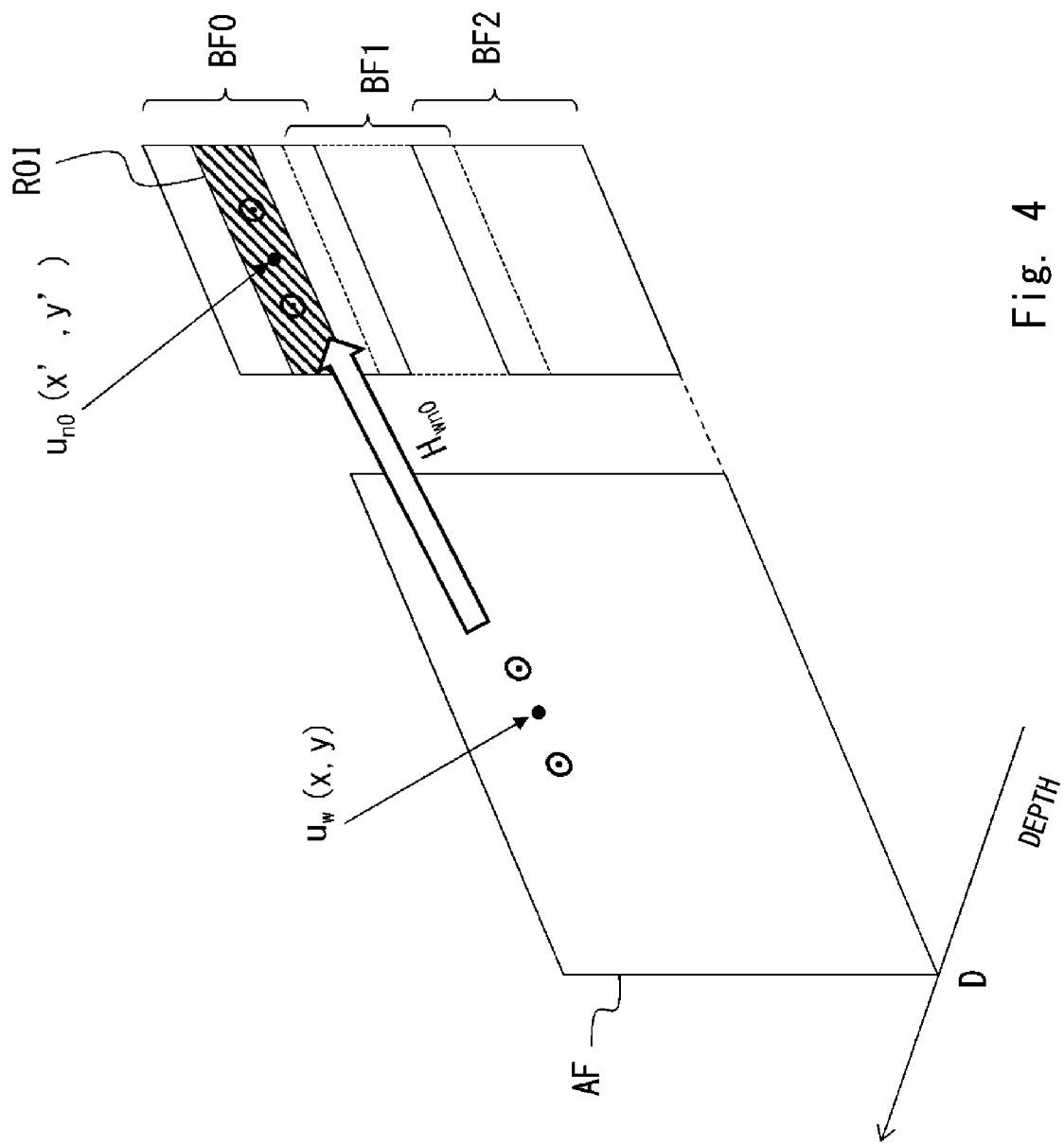
FIG. 4 is a diagram for describing coordinate transformation processing according to the basic configuration of the example embodiment.

FIG. 4 illustrates an image of coordinate transformation processing of eyes in the coordinate transformation unit 133. On an assumption that the target person P stands in advance at the depth D, a coordinate transformation matrix (projection matrix) of the angle of view AF that can be captured by the wide field of view camera 120 and the angle of view BF that can be captured by the iris camera 110 is acquired in advance. The coordinate transformation matrix is a matrix of 3×3, and can be acquired from a position at the depth D and a camera parameter of each camera. The coordinate transformation matrix in a number of the iris cameras 110 is acquired, and the plurality of acquired coordinate transformation matrices ($H_{wn0}$, $H_{wn1}$, $H_{wn2}$ . . . ) are stored in the matrix storage unit 202.

The coordinate transformation unit 133 transforms coordinates of eyes in a wide field of view image (angle of view AF) of the wide field of view camera 120 into coordinates at the angle of view BF of the iris camera 110 by using the coordinate transformation matrix for each iris camera 110. As illustrated in FIG. 4, coordinates of eyes on a wide field of view image being captured by the wide field of view camera 120 are $u_w = [xy1]^T$, and the coordinates $u_w$ are transformed by the plurality of coordinate transformation matrices ($H_{wn0}$, $H_{wn1}$, $H_{wn2}$ . . . ). For example, when transformation into coordinates at an angle of view BF0 of the iris camera 110-0 is performed, coordinates after the transformation are $u_{n0} = H_{wn0} \cdot u_w$. In this example, a position of eyes of the target person P is predicted to be captured on the coordinates $u_{n0}$ on the angle of view BF0 of the iris camera 110-0.

Then, the control device 130 performs selection of the iris camera 110 and setting of the ROI (S104). When the coordinates of the eyes are transformed, the iris camera setting unit 134 selects the iris camera 110 for capturing the irises of the target person P, based on the coordinates after the transformation, and further sets the ROI for the selected iris camera 110.

As described above, coordinates are transformed by using the plurality of coordinate transformation matrices ($H_{wn0}$, $H_{wn1}$, $H_{wn2}$ . . . ), and the iris camera 110 estimated to be able to capture the irises of the target person P from $u_{ni}$ after the transformation is selected. Specifically, the angle of view BF of the iris camera 110 including coordinates of the eyes after the transformation is determined. For example, as illustrated in FIG. 4, when coordinates of the eyes after the coordinate transformation are included at the angle of view BF0 of the iris camera 110-0, the iris camera 110-0 is selected as an iris camera that captures the irises of the target person P.

Furthermore, the iris camera setting unit 134 sets the ROI in such a way that the ROI includes the coordinates of the eyes after the transformation. For example, when the iris camera 110-0 is selected, the ROI is set in such a way that the coordinates of the eyes after the transformation are located at the center of the ROI (center in the vertical direction) at the angle of view BF0.

Then, the iris camera 110 captures the irises of the target person P (S105). The iris camera setting unit 134 performs selection of the iris camera 110 and setting of the ROI, and also outputs a trigger of an imaging start to the iris camera 110. Furthermore, the lens focus control unit 135 starts focus scanning driving of the variable focus lens 111 of the selected iris camera 110. Then, the iris camera 110 starts the burst imaging on the ROI in a predetermined scanning range, and outputs a plurality of iris camera images (burst images) acquired by performing continuous capturing to the control device 130.

Then, the control device 130 extracts an iris image focusing on the irises (S106). When the iris camera 110 performs the burst imaging on the target person P, the iris image acquisition unit 136 extracts the iris image focusing on the irises of the target person P from among the plurality of acquired burst images.

Then, the control device 130 performs registration or authentication of the target person P (S107). When the focusing iris image is extracted, the registration authentication unit 137 performs registration processing or authentication processing, based on the extracted iris image. When the registration processing is performed, the registration authentication unit 137 extracts a feature value from a pattern of the irises of the iris image, and registers the extracted feature value in the database 201. When the authentication processing is performed, the registration authentication unit 137 extracts a feature value from a pattern of the irises of the iris image, verifies the extracted feature value with a feature value registered in the database 201, and determines coincidence or non-coincidence, based on a similarity score.

<Consideration of Basic Configuration>

As described above, in the basic configuration, angles of view are associated with each other in advance between a wide field of view camera and an iris camera, coordinates of eyes within the angle of view of the iris camera are calculated from a detection result of the eyes in a wide field of view image, and selection of the iris camera and setting of an ROI are performed based on the calculated coordinates of the eyes.

However, in the basic configuration, it is assumed that a target person stands in a predetermined depth position (depth D). Thus, when a position of the target person deviates from the predetermined depth position, there is a risk that a difference between the ROI (capturing area) of the iris camera being selected and set and an actual position of eyes of the target person may occur.

In other words, as described above, a coordinate transformation matrix being prepared in advance is a coordinate transformation matrix ($H_{wn0D}$, $H_{wn1D}$, $H_{wn2D}$ ...) when a capturing position is only the depth D for each of a plurality of iris cameras. A depth of a target person varies depending on a standing position and a posture of the target person, and thus an error occurs in coordinates after transformation when coordinate transformation is performed by using the coordinate transformation matrix. Then, due to a difference in the depth position of the target person, irises may not be included in an image captured by the iris camera and imaging of the irises may fail.

Thus, in the following example embodiment, even when a depth position of a target person deviates, irises of the target person can be appropriately captured by an iris camera.

First Example Embodiment

Figure 5:
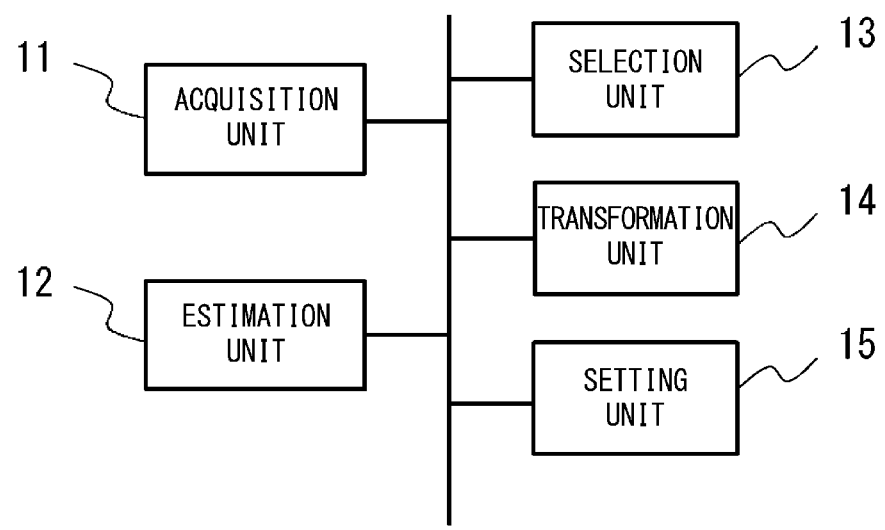
FIG. 5 is a configuration diagram illustrating a configuration example of an imaging system according to a first example embodiment.

Next, a first example embodiment will be described. FIG. 5 illustrates a configuration example of an imaging system according to the present example embodiment. As illustrated in FIG. 5, an imaging system (imaging device) 10 according to the present example embodiment includes an acquisition unit 11, an estimation unit 12, a selection unit 13, a transformation unit 14, and a setting unit 15.

The acquisition unit 11 acquires an iris image captured by an iris camera for capturing an iris of a target person at a first angle of view or a wide field of view image captured by a wide field of view camera for capturing the target person at a second angle of view wider than the iris imaging camera. The estimation unit 12 estimates a three-dimensional position of the target person included in the wide field of view image being acquired from the wide field of view camera.

The selection unit 13 selects a coordinate transformation matrix that transforms the three-dimensional position of the target person into two-dimensional coordinates at the first angle of view. For example, a perspective projection matrix P=[RT] (transformation matrix that can be represented by a three-dimensional rotation matrix R and a three-dimensional translational vector T) from wide field of view camera coordinates into iris camera coordinates and an inner parameter matrix A of an iris camera are acquired in advance (stored in advance in a matrix storage unit, for example). Then, with three-dimensional coordinates detected on the wide field of view camera coordinates as $X=[xyz1]^T$, three-dimensional coordinates transformed onto the iris camera coordinates are $X_i=PX$, and two-dimensional coordinates indicating a point on an angle of view of the iris camera can be acquired as in $x_i=AX_i$. Note that, when there are a plurality of iris cameras, P and A are each different by the number of the iris cameras. The selection unit 13 selects a coordinate transformation matrix that transforms three-dimensional coordinates on the wide field of view camera coordinates into two-dimensional coordinates on the angle of view of the iris camera.

Further, the selection unit 13 may select a coordinate transformation matrix according to an estimated three-dimensional position from among a plurality of coordinate transformation matrices that transform two-dimensional coordinates at the second angle of view being prepared in association with a three-dimensional position of a target person into two-dimensional coordinates at the first angle of view. The transformation unit 14 transforms coordinates of eyes of the target person included in the wide field of view image associated with the estimated three-dimensional position into two-dimensional coordinates at the first angle of view, based on the selected coordinate transformation matrix. The setting unit 15 sets a parameter for the iris camera to capture irises of the target person, based on the transformed coordinates of the eyes of the target person.

In such a manner, in the present example embodiment, a plurality of coordinate transformation matrices that transform a three-dimensional position (depth) being captured in advance into two-dimensional coordinates at an angle of view of an iris camera or a plurality of coordinate transformation matrices that transform two-dimensional coordinates at an angle of view of a wide field of view camera into two-dimensional coordinates at an angle of view of an iris camera are prepared in advance in association with a three-dimensional position, and, when the wide field of view camera captures a target person, a coordinate transformation matrix according to an estimated position of the captured target person is selected. In this way, coordinate transformation can be performed according to an actual position of the target person, and thus a parameter of the iris camera can be appropriately set and irises of the target person can be captured.

Second Example Embodiment

Next, a second example embodiment will be described. In the present example embodiment, the setting unit 15 in the imaging system according to the first example embodiment sets an ROI including eyes of a target person within a first angle of view of an iris camera, based on transformed coordinates of the eyes of the target person. By setting the ROI as a parameter of the iris camera, irises of the target person can be reliably captured.

Third Example Embodiment

Next, a third example embodiment will be described. The present example embodiment is an example of estimating a depth position of a target person and selecting a coordinate transformation matrix suitable for the estimated depth position in the imaging system having the basic configuration. A configuration of an imaging system according to the present example embodiment is similar to that in FIG. 1.

Figure 6:
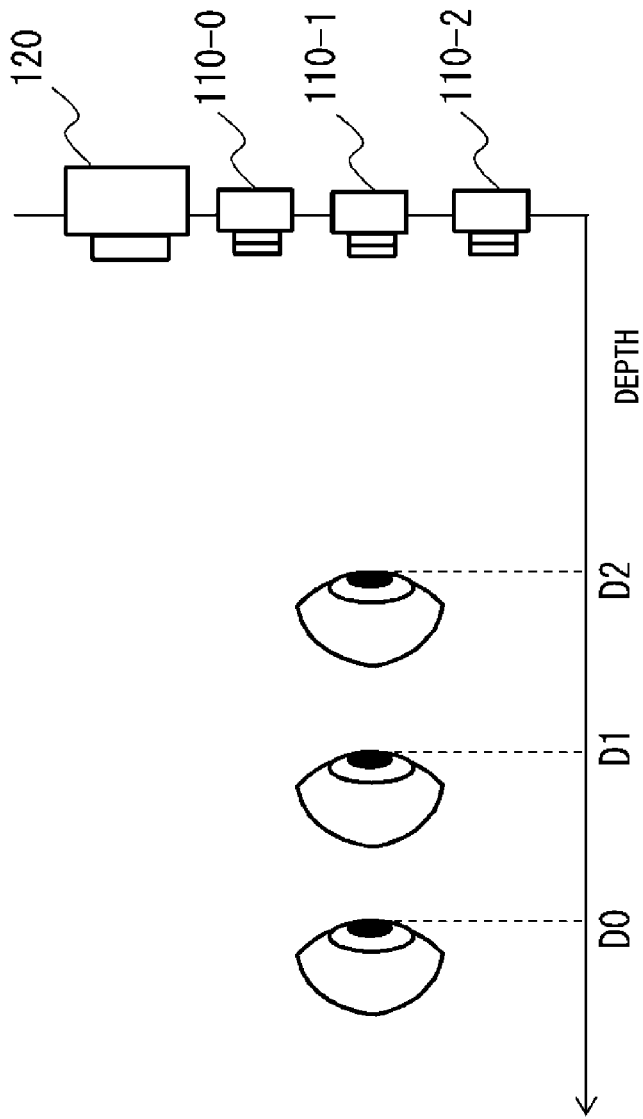
FIG. 6 is a diagram illustrating a specific example of a lookup table according to a third example embodiment.

In the present example embodiment, a plurality of coordinate transformation matrices associated with a depth position (three-dimensional position) are stored in a matrix storage unit 202 of a control device 130. For example, as illustrated in FIG. 6, a lookup table in which a coordinate transformation matrix of a plurality of iris cameras 110 is set for each depth position is stored. With depth positions as D0, D1, and D2, a coordinate transformation matrix ($H_{wn0D0}$, $H_{wn1D0}$, $H_{wn2D0}$ ...) of the plurality of iris cameras 110 is prepared for the depth D0, a coordinate transformation matrix ($H_{wn0D1}$, $H_{wn1D1}$, $H_{wn2D1}$ ...) of the plurality of iris cameras 110 is prepared for the depth D1, and a coordinate transformation matrix ($H_{wn0D2}$, $H_{wn1D2}$, $H_{wn2D2}$ ...) of the plurality of iris cameras 110 is prepared for the depth D2.

Each of the coordinate transformation matrices can be acquired in advance similarly to the basic configuration. In other words, on an assumption that a target person P stands at the depths D0, D1, and D2, a coordinate transformation matrix for the depths D0, D1, and D2 is acquired from a position at each of the depths D0, D1, and D2 and a camera parameter of each camera.

Figure 7:
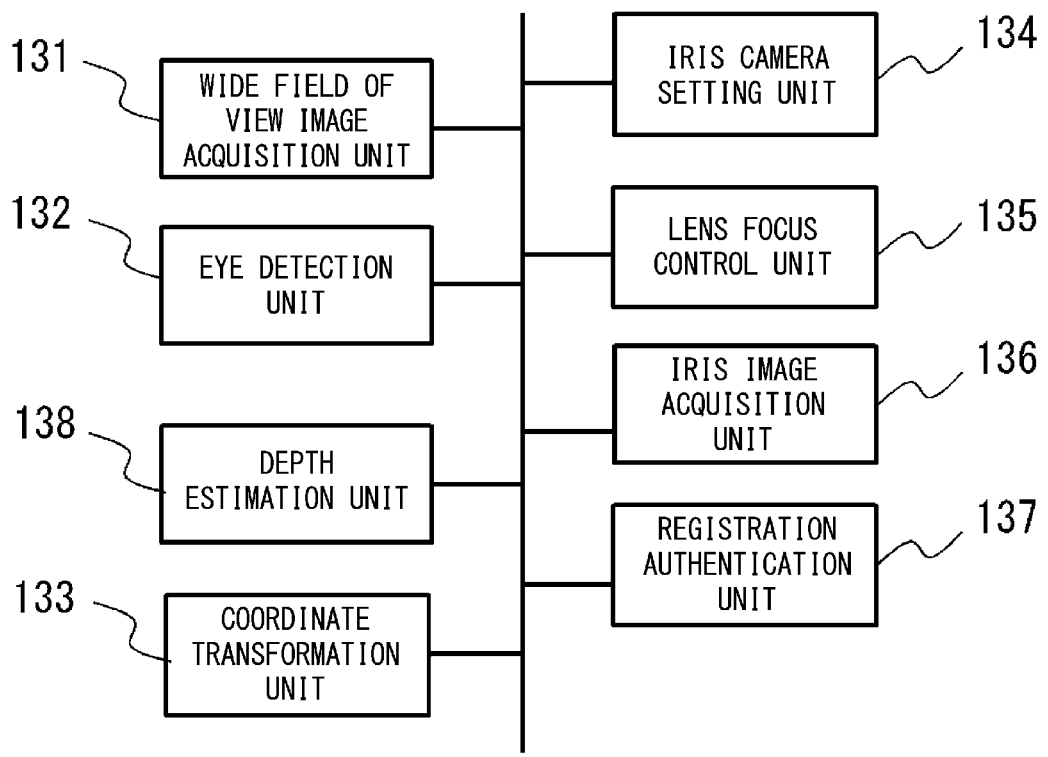
FIG. 7 is a configuration diagram illustrating a configuration example of a control device according to the third example embodiment.

FIG. 7 illustrates a configuration example of the control device 130 according to the present example embodiment. In the example in FIG. 7, a depth estimation unit 138 is further provided as compared to the configuration in FIG. 2. The depth estimation unit 138 estimates a depth position of the target person P being captured by a wide field of view camera 120. A depth position of the target person P may be able to be roughly estimated, and an estimation method is not limited.

Further, in the present example embodiment, a coordinate transformation unit 133 selects a coordinate transformation matrix from the lookup table of the matrix storage unit 202 according to the depth position of the target person P being estimated by the depth estimation unit 138, and transforms coordinates of eyes of the captured target person P by using the selected coordinate transformation matrix.

Figure 8:
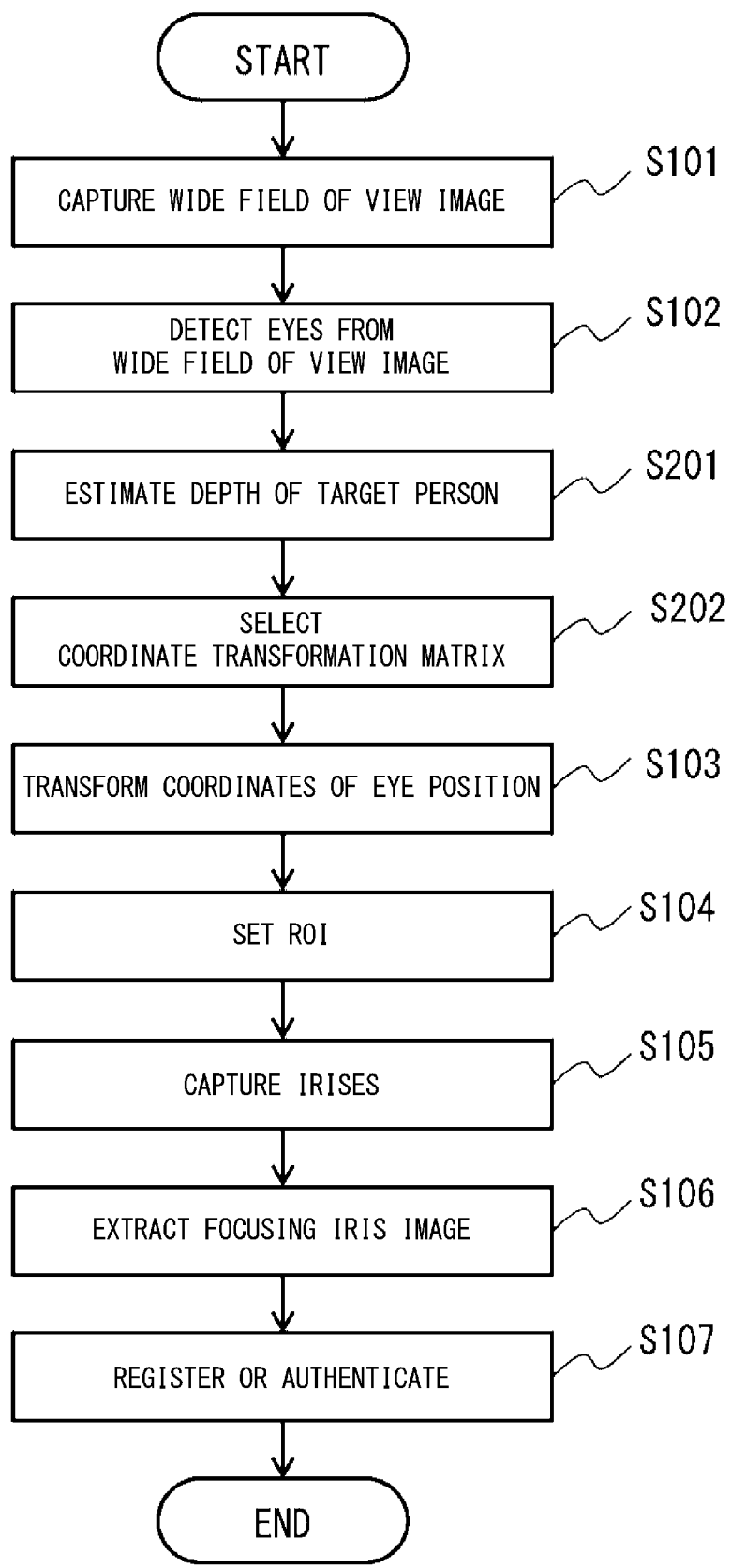
FIG. 8 is a flowchart illustrating an operation example of an imaging system according to the third example embodiment.

FIG. 8 illustrates an operation example of the imaging system according to the present example embodiment. In the example in FIG. 8, as compared to the operation in FIG. 3, depth estimation processing (S201) of a target person and coordinate transformation matrix selection processing (S202) are added. In other words, similarly to FIG. 3, the wide field of view camera 120 captures a wide field of view image (S101), and the control device 130 detects eyes of the target person P from the wide field of view image (S102).

Then, the depth estimation unit 138 of the control device 130 estimates a depth position of the target person P (S201). For example, the depth estimation unit 138 estimates (detects) a depth position of the target person P by using focus control of the wide field of view camera 120 and various sensors as in an example embodiment described below.

Then, the coordinate transformation unit 133 of the control device 130 selects a coordinate transformation matrix for transforming coordinates of the position of the eyes of the target person P (S202). The coordinate transformation unit 133 refers to the lookup table of the matrix storage unit 202, and selects a coordinate transformation matrix associated with the estimated depth position. For example, in the lookup table in FIG. 6, when the estimated depth position is D1, the coordinate transformation matrix ($H_{wn0D1}$, $H_{wn1D1}$, $H_{wn2D1}$ ...) is selected.

Then, similarly to FIG. 3, the control device 130 transforms coordinates of the position of the eyes of the target person P by using the selected coordinate transformation matrix (S103), and performs setting of an ROI, based on the transformed coordinates (S104). For example, when the coordinate transformation matrix ($H_{wn0D1}$, $H_{wn1D1}$, $H_{wn2D1}$ ...) is selected, coordinate transformation is performed by using the coordinate transformation matrix, and the ROI is set in the capturing iris camera 110 from an angle of view BF including the coordinates of the eyes after the transformation. Then, similarly to FIG. 3, irises of the target person P may be captured, and registration or authentication of the target person P may be performed (S105 to S107).

As describe above, in the present example embodiment, a depth position of a target person is roughly estimated, coordinates of eyes of the target person are transformed by using a coordinate transformation matrix associated with the estimated depth position, and an ROI of an iris camera is set based on the coordinates after the transformation. In this way, coordinate transformation suitable for a position of the target person can be performed, and thus a difference between the set ROI and an actual position of the eyes can be suppressed, and irises of the target person can be reliably captured.

Fourth Example Embodiment

Next, a fourth example embodiment will be described. A configuration of an imaging system according to the present example embodiment is similar to that in the third example embodiment.

Figure 9:
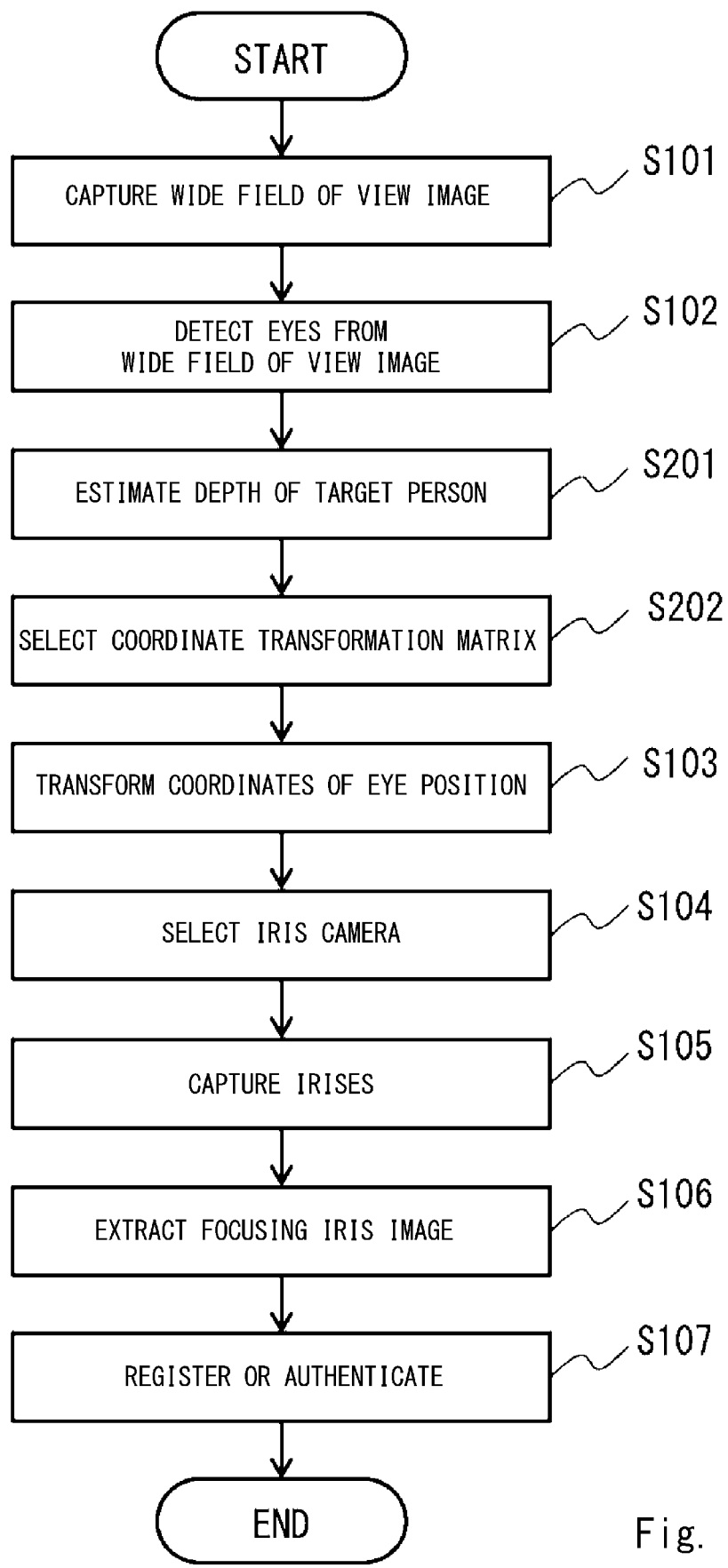
FIG. 9 is a flowchart illustrating an operation example of an imaging system according to a fourth example embodiment.

FIG. 9 illustrates an operation example of the imaging system according to the present example embodiment. In the example in FIG. 9, only S104 is different as compared to the operation in FIG. 8. In other words, in the present example embodiment, in S104, a control device 130 performs selection of an iris camera, based on coordinates of eyes of a target person P being transformed by using a coordinate transformation matrix. For example, when the coordinate transformation matrix ($H_{wn0D1}$, $H_{wn1D1}$, $H_{wn2D1}$ ...) is selected, coordinate transformation is performed by using the coordinate transformation matrix, and a capturing iris camera 110 is selected from an angle of view BF including the coordinates of the eyes after the transformation.

In the present example embodiment, coordinates of eyes of a target person are transformed by using a coordinate transformation matrix associated with an estimated depth position, and an iris camera is selected based on the coordinates after the transformation. In this way, a difference between a capturing area of the selected iris camera and an actual position of the eyes can be suppressed, and irises of the target person can be reliably captured.

Fifth Embodiment

Next, a fifth example embodiment will be described. The present example embodiment is an example of further setting a focal position of an iris camera according to an estimated depth position of a target person in the imaging system in the third or fourth example embodiment. A configuration of an imaging system according to the present example embodiment is similar to that in the third or fourth example embodiment.

Figure 10:
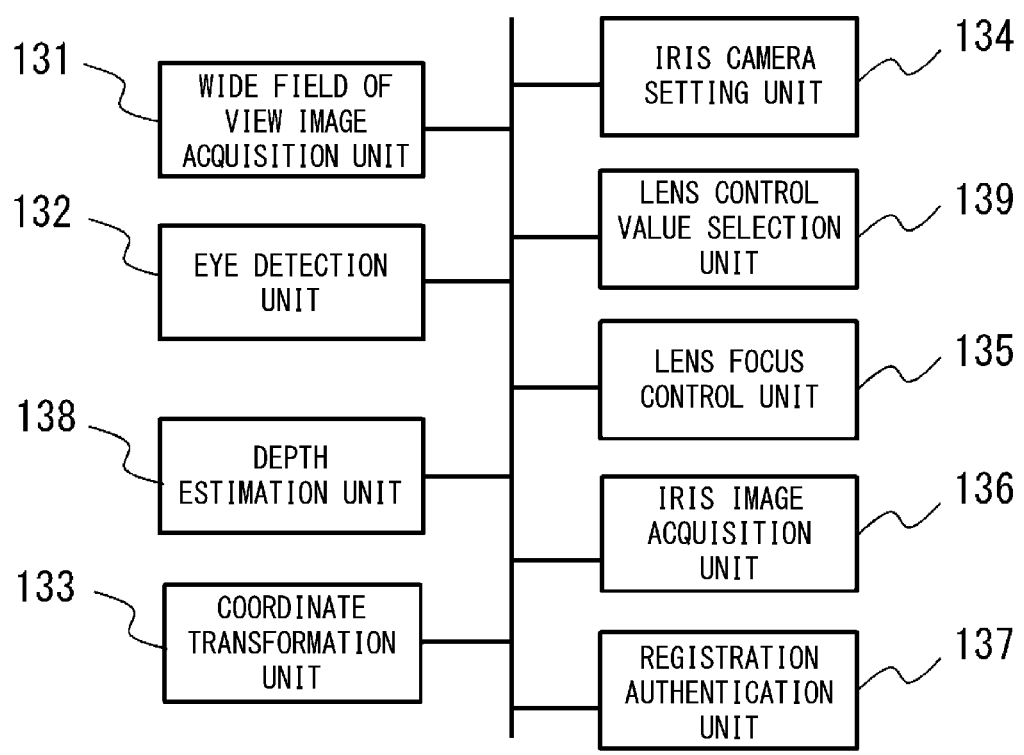
FIG. 10 is a configuration diagram illustrating a configuration example of a control device according to a fifth example embodiment.

FIG. 10 illustrates a configuration example of a control device 130 according to the present example embodiment. In the example in FIG. 10, a lens control value selection unit 139 is further provided as compared to the configuration in FIG. 7. The lens control value selection unit 139 sets a focal position of an iris camera 110 according to a depth position of a target person P being estimated by a depth estimation unit 138.

Figure 11:
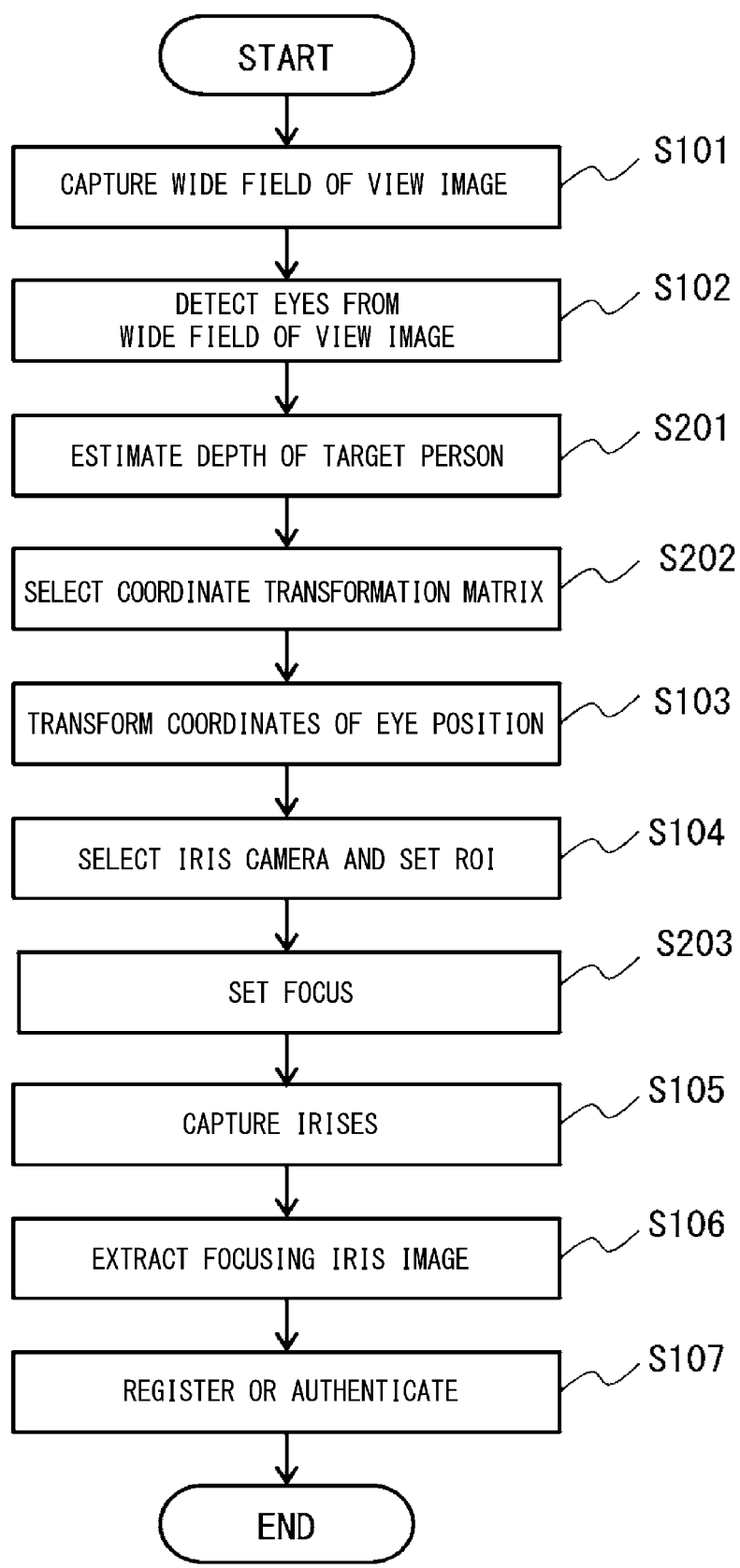
FIG. 11 is a flowchart illustrating an operation example of an imaging system according to the fifth example embodiment.

FIG. 11 illustrates an operation example of the imaging system according to the present example embodiment. In the example in FIG. 11, as compared to the operation in FIG. 8 or 9, focus setting processing (S203) is added. In other words, similarly to FIG. 8 or 9, after a wide field of view image is captured, the control device 130 transforms coordinates of a position of eyes by using a coordinate transformation matrix according to an estimated depth position of the target person P, and performs selection of an iris camera and setting of an ROI (S101 to S102, S201 to S202, S103 to S104).

Then, the lens control value selection unit 139 of the control device 130 sets a focal position of the iris camera 110 (S203). The lens control value selection unit 139 sets the focal position associated with the estimated depth position.

Then, the iris camera 110 captures irises of the target person P according to the set focal position (S105). A lens focus control unit 135 drives a variable focus lens 111 of the iris camera 110 by the set focal position, and the iris camera 110 performs the burst imaging on the ROI in a range in which the variable focus lens 111 is driven. Then, similarly to FIG. 8 or 9, an iris image may be extracted, and registration or authentication of the target person P may be performed (S106 to S107).

Since focus scanning of an iris camera is performed in a fixed wide range in the basic configuration described above, the focus scanning takes a longer time as an initial focal position of the focus scanning and a focal position of eyes of a target person are farther from each other. Thus, in the present example embodiment, a focal position (scanning position) of an iris camera is set according to an estimated depth position of a target person. In this way, a difference between a focal position in which the focus scanning is performed and a focal position of eyes of the target person can be reduced, and thus time for the focus scanning can be shortened and iris imaging can be quickly performed. Note that a focal position of an iris camera may be set according to a depth position of a target person as in the present example embodiment without performing selection of a coordinate transformation matrix described in the first example embodiment.

Sixth Example Embodiment

Next, a sixth example embodiment will be described. A configuration of an imaging system according to the present example embodiment is similar to that in the fifth example embodiment. In the present example embodiment, a lens control value selection unit 139 sets a scanning range in which the burst imaging of an iris camera 110 is performed according to a depth position of a target person P being estimated by a depth estimation unit 138. In this way, an image focusing on irises of the target person can be reliably captured in the set scanning range.

Seventh Example Embodiment

Next, a seventh example embodiment will be described. A configuration of an imaging system according to the present example embodiment is similar to that in the fifth or sixth example embodiment. In the present example embodiment, a lens control value selection unit 139 sets a lens focus driving value of a variable focus lens 111 of an iris camera 110 according to a depth position of a target person P being estimated by a depth estimation unit 138. For example, the lens control value selection unit 139 stores, in advance in a storage means, a lens control table in which a lens focus driving value set for each depth is associated, and selects a lens focus driving value, based on the lens control table. Note that a lens focus driving value according to a depth position may be acquired by using a predetermined calculation equation. In this way, a focus of an iris camera can be accurately controlled.

Eighth Example Embodiment

Next, an eighth example embodiment will be described. The present example embodiment is an example of estimating a depth position of a target person by using a focusing value of a variable focus lens of a wide field of view camera as a specific example of a depth estimation in the imaging system in any of the third to seventh example embodiments.

Figure 12:
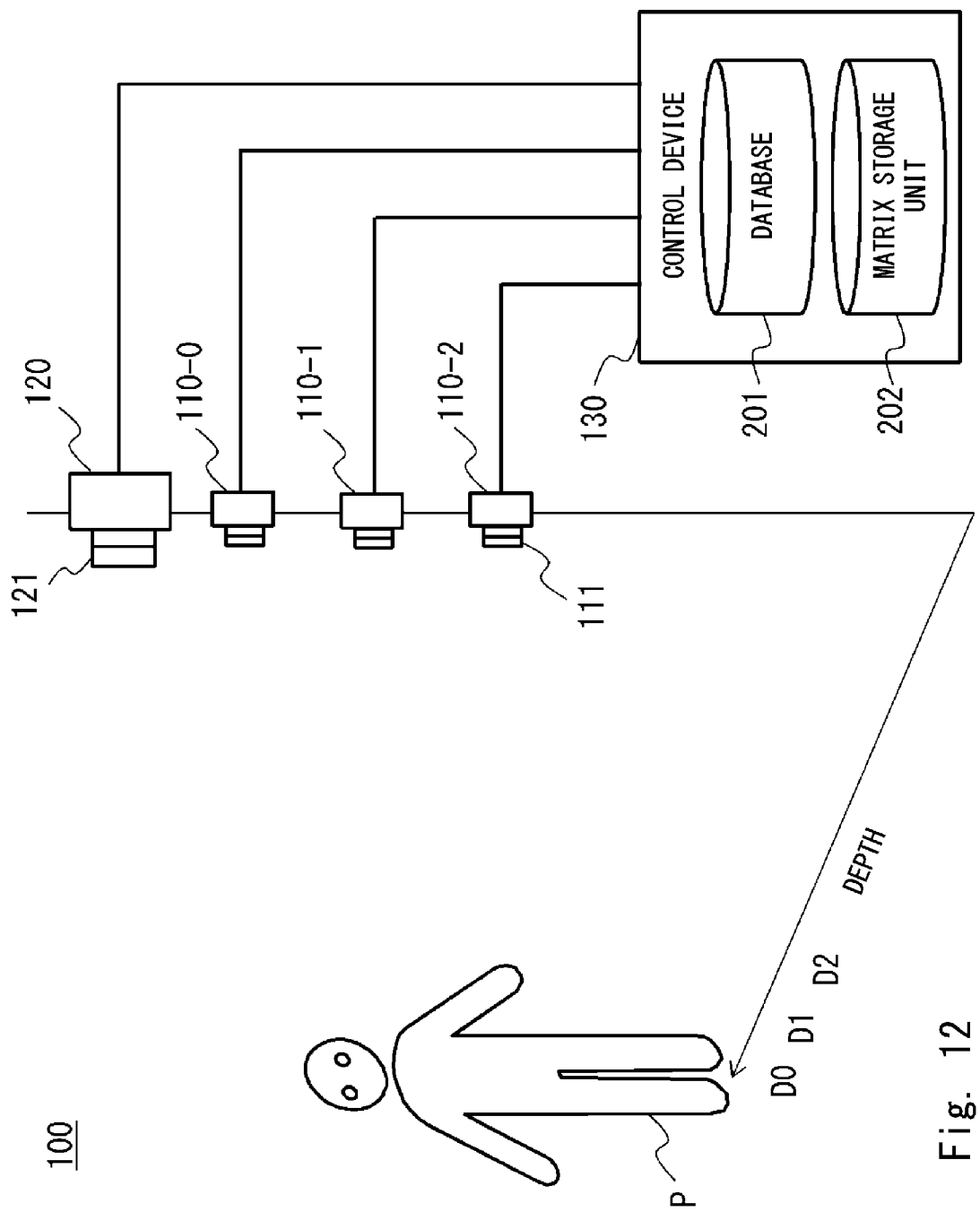
FIG. 12 is a configuration diagram illustrating a configuration example of an imaging system according to an eighth example embodiment.

FIG. 12 illustrates a configuration example of an imaging system 100 according to the present example embodiment. In the example in FIG. 12, a variable focus lens 121 is attached to a wide field of view camera 120 as compared to the configuration in FIG. 1. Similarly to a variable focus lens 111 of an iris camera 110, the variable focus lens 121 is, for example, a liquid lens, but may be another lens that can control a focal position.

A configuration of a control device and an operation of the imaging system are basically similar to those in the first or second example embodiment. In the present example embodiment, a depth estimation unit 138 of a control device 130 estimates a depth, based on a focal position focusing on a target person P in a wide field of view image.

In such a manner, in the example embodiment described above, a depth position of the target person P may be estimated based on a focal position focusing on the target person in a wide field of view image. In this way, an iris camera can be more appropriately set.

Ninth Example Embodiment

Next, a ninth example embodiment will be described. A configuration of an imaging system according to the present example embodiment is similar to that in the eighth example embodiment. In the present example embodiment, a depth estimation unit 138 estimates a depth, based on a position focusing on a region of a face of a target person P.

Figure 13:
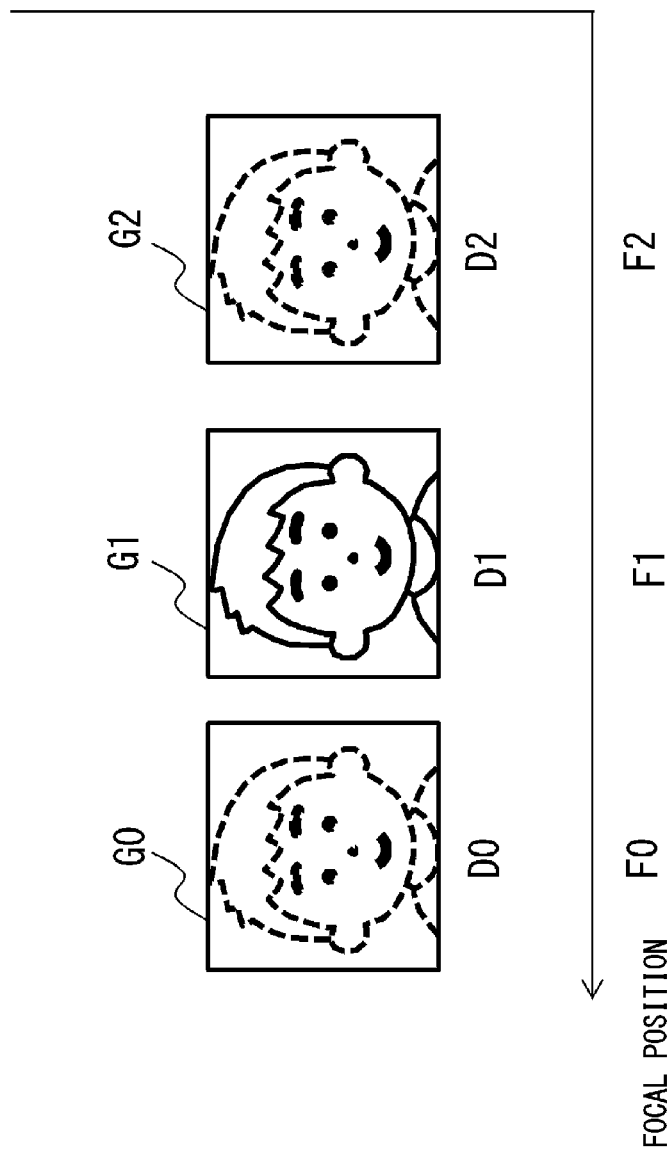
FIG. 13 is a diagram for describing depth estimation processing according to a ninth example embodiment.

For example, as illustrated in FIG. 13, a focal position is moved by driving a variable focus lens 121, and a focal position focusing on a region of a face is detected. For example, a focus is detected when a contrast of a region of a face is the greatest, and a depth position (distance from a wide field of view camera 120 to a face of the target person P) from a lens driving value when the focus is detected. In the example in FIG. 13, images G0 to G2 are captured by driving a focal position to F0 to F2, and the image G1 is determined to be an image focusing on a face since a contrast of the image G1 is the greatest. Then, a depth D1 associated with the focal position when the image G1 is captured is a depth estimation value of the target person P.

Note that a difference between a focal position focusing on a face and a depth position of eyes (irises) may be stored in advance in a table, and an estimated depth position may be corrected according to a value in the table. For example, a correction value may be prepared for each height.

In such a manner, a depth position of the target person P may be estimated based on a focal position focusing on a region of a face of the target person in a wide field of view image. In this way, a depth position of eyes can be more accurately recognized, and an iris camera can be appropriately set according to the depth position of the eyes.

Tenth Example Embodiment

Next, a tenth example embodiment will be described. A configuration of an imaging system according to the present example embodiment is similar to that in the eighth or ninth example embodiment. In the present example embodiment, a depth estimation unit 138 drives a variable focus lens 121 of a wide field of view camera 120, and estimates a depth, based on a lens focus driving value of a focal position focusing on a region of a face of a target person P in a wide field of view image. For example, a depth table in which a depth position is associated with each lens focus driving value may be stored in advance in a storage means, and a depth may be estimated based on the depth table. In this way, a depth can be accurately estimated based on a focusing position.

Eleventh Example Embodiment

Next, an eleventh example embodiment will be described. The present example embodiment is an example of estimating a depth position of a target person by using a depth sensor as a specific example of a depth estimation in the imaging system in any of the third to seventh example embodiments.

Figure 14:
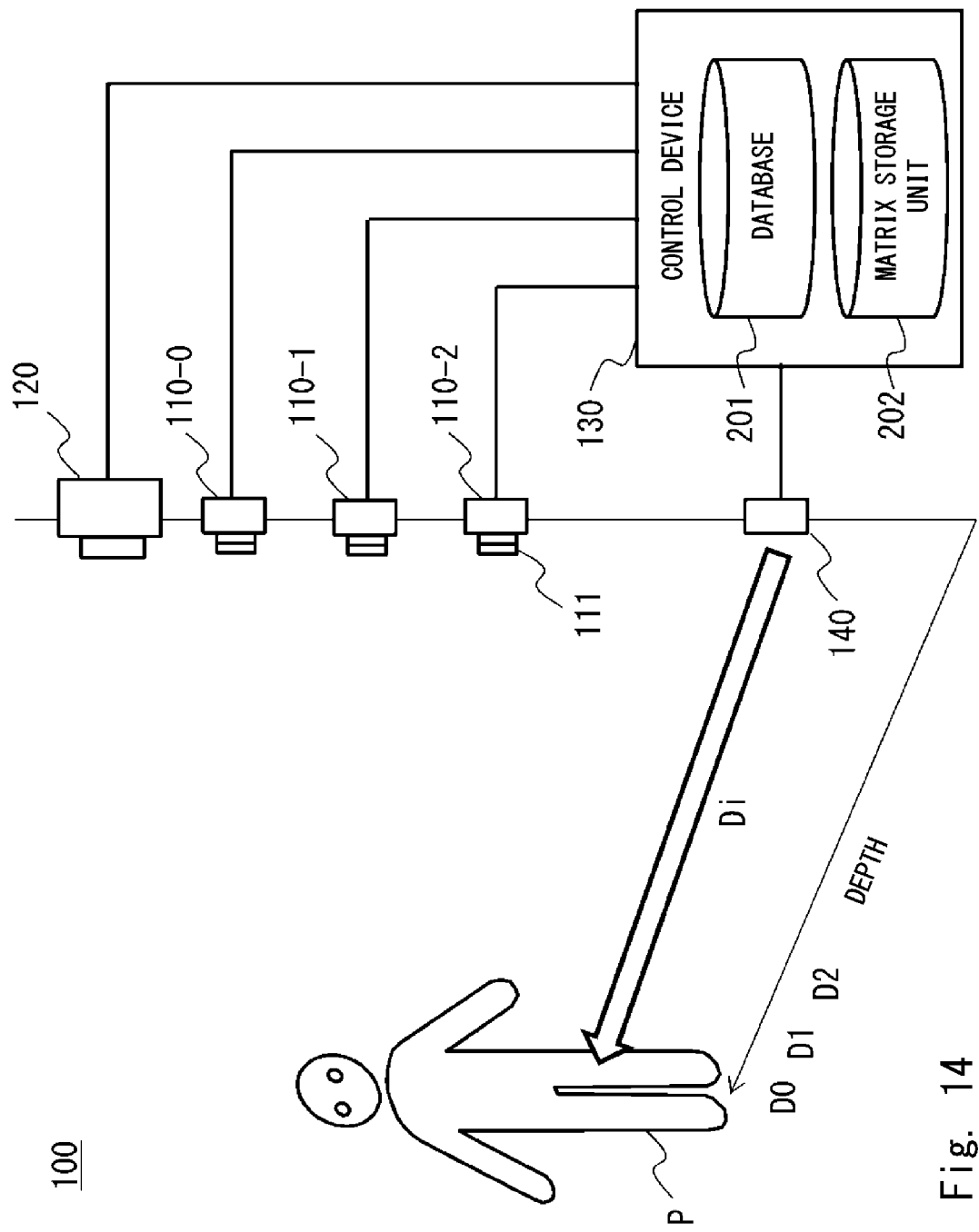
FIG. 14 is a configuration diagram illustrating a configuration example of an imaging system according to an eleventh example embodiment.

FIG. 14 illustrates a configuration example of an imaging system 100 according to the present example embodiment. In the example in FIG. 14, a depth sensor 140 is further provided as compared to the configuration in FIG. 1. In the present example embodiment, the depth sensor 140 detects a depth Di of a target person P. For example, the depth sensor 140 is installed in the same position as that of an iris camera or a wide field of view camera, and measures a depth (distance) from the iris camera or the wide field of view camera to the target person P. A depth estimation unit 138 estimates a depth, based on an identification result of the depth sensor 140.

The depth sensor 140 is, for example, an ultrasonic sensor or a millimeter wave sensor. Note that an optical sensor (ToF: time of flight) having the same wavelength as that of an illumination means for an iris is not preferably used. Further, a depth of the target person P may be detected with, as a stereo camera, a wide field of view camera instead of the depth sensor 140. A depth may be estimated based on a depth of the target person P being acquired from a wide field of view image captured by the stereo camera.

In such a manner, in the example embodiment described above, a depth position of the target person P may be estimated by using a depth sensor. In this way, a depth position of the target person can be reliably recognized, and an iris camera can be appropriately set according to the depth position of the target person.

Twelfth Example Embodiment

Next, a twelfth example embodiment will be described. The present example embodiment is an example of providing a stereo camera as a wide field of view camera in the imaging system in any of the third to seventh example embodiments. A depth of a target person P may be detected by providing a stereo camera as a wide field of view camera. A depth may be estimated based on a depth of the target person P being acquired from a wide field of view image captured by the stereo camera. In this way, a depth position of the target person can be reliably recognized, and an iris camera can be appropriately set according to the depth position of the target person.

Thirteenth Example Embodiment

Next, a thirteenth example embodiment will be described. The present example embodiment is an example of estimating a depth position of a target person by using a plurality of detection sensors as a specific example of a depth estimation in the imaging system in any of the third to seventh example embodiments.

Figure 15:
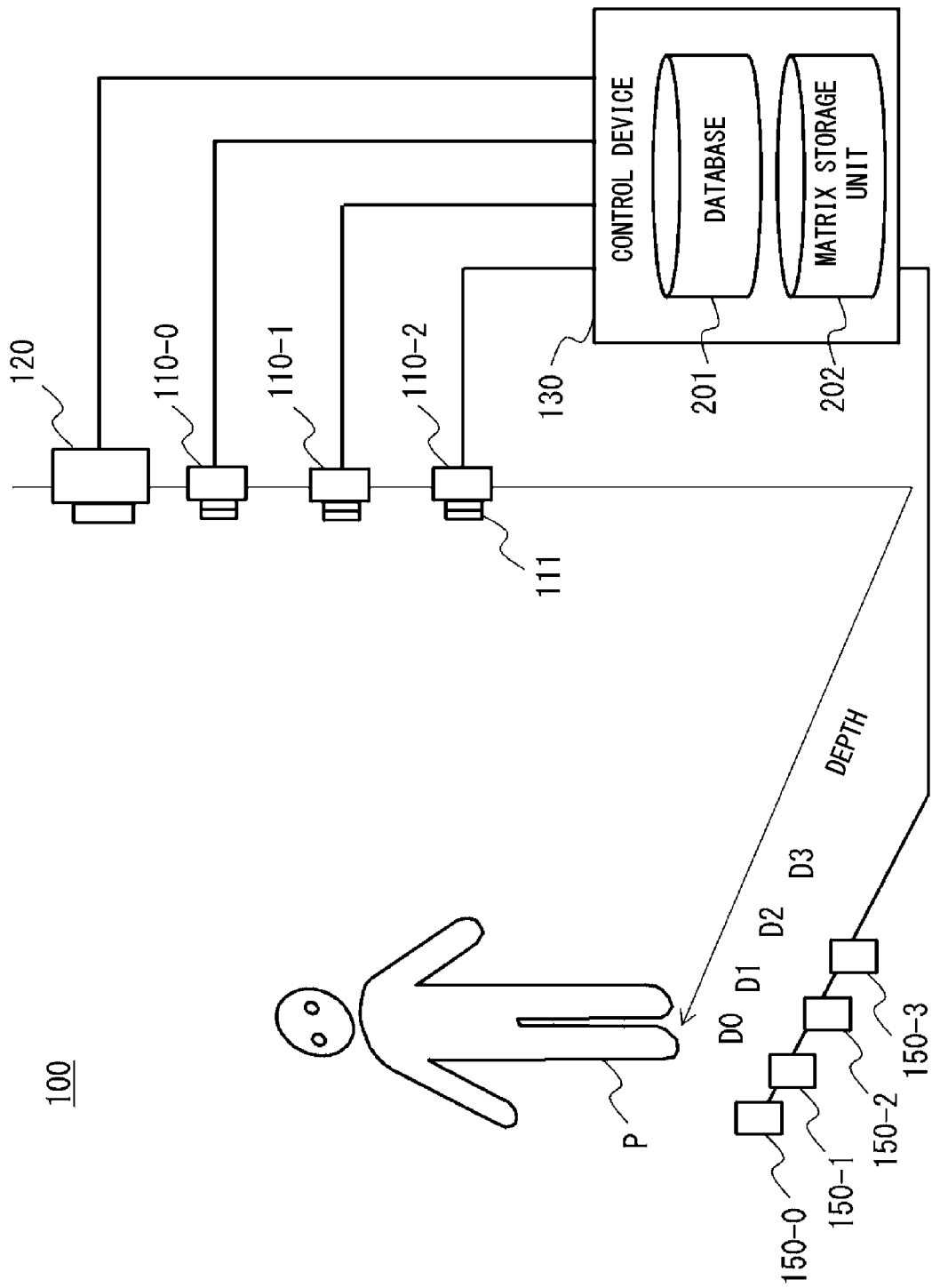
FIG. 15 is a configuration diagram illustrating a configuration example of an imaging system according to a thirteenth example embodiment.

FIG. 15 illustrates a configuration example of an imaging system 100 according to the present example embodiment. In the example in FIG. 15, a plurality of detection sensors 150 are further provided as compared to the configuration in FIG. 1. The detection sensor 150 is a human detection sensor that can detect presence of a person, and is, for example, an infrared sensor. The detection sensor 150 sets an output signal to ON when a person is present in front of the sensor, and sets an output signal to OFF when a person is not present in front of the sensor. A depth estimation unit 138 estimates a depth, based on a detection result of the detection sensor 150.

For example, the plurality of detection sensors 150 are installed at a regular interval in a depth direction. In this example, detection sensors 150-0 to 150-3 are installed in positions at depths D0 to D3, respectively. A position associated with a sensor that detects a person and outputs an ON signal among the detection sensors 150-0 to 150-3 is estimated as a depth position of a target person P.

In such a manner, in the example embodiment described above, a depth position of the target person P may be estimated by using a plurality of detection sensors. In this way, similarly to the fourth example embodiment, a depth position of the target person can be reliably recognized, and an iris camera can be appropriately set according to the depth position of the target person.

Note that this disclosure is not limited to the example embodiments described above, and may be appropriately modified without departing from the scope of the present disclosure.

Figure 16:
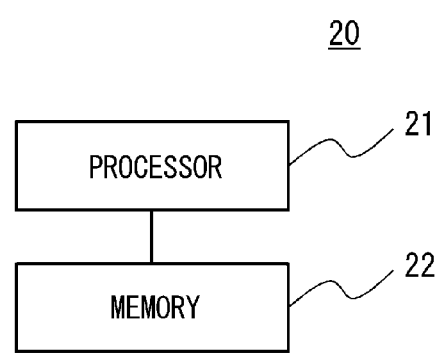
FIG. 16 is a configuration diagram illustrating an outline of hardware of a computer according to the example embodiment.

Further, each configuration in the example embodiments described above is formed of hardware, software, or both, and may be formed of one piece of hardware or one piece of software, or may be formed of a plurality of pieces of hardware or a plurality of pieces of software. Each device and each function (processing) may be achieved by a computer 20 including a processor 21 and a memory 22 being a storage device as illustrated in FIG. 16. For example, a program for performing a method (for example, a capturing method in a control device) in the example embodiment may be stored in the memory 22, and each function may be achieved by executing the program stored in the memory 22 by the processor 21. Note that, as the processor 21, a central processing unit (CPU), a graphics processing unit (GPU), a field-programmable gate array (FPGA), a digital signal processor (DSP), an application specific integrated circuit (ASIC), and the like may be used. Further, a plurality thereof may be used in parallel.

Further, the programs are stored by using a non-transitory computer-readable medium of various types, and can be supplied to a computer. The non-transitory computer-readable medium includes a tangible storage medium of various types. Examples of the non-transitory computer-readable medium include a magnetic recording medium (for example, a flexible disk, a magnetic tape, and a hard disk drive), a magneto-optical recording medium (for example, a magneto-optical disk), a CD-read only memory (CD-ROM), a CD-R, a CD-R/W, and a semiconductor memory (for example, a mask ROM, a programmable ROM (PROM), an erasable PROM (EPROM), a flash ROM, and a random access memory (RAM)). Further, a program may be supplied to a computer by a transitory computer readable medium of various types. Examples of the transitory computer-readable medium include an electric signal, an optical signal, and an electromagnetic wave. The transitory computer-readable medium can supply a program to a computer via a wired communication path such as an electric wire and an optical fiber or a wireless communication path.

Although this disclosure has been described above with reference to the example embodiments, this disclosure is not limited to the above-described example embodiments. Various modifications that can be understood by those skilled in the art can be made to the configuration and the details of this disclosure within the scope of the invention.

A part or the whole of the above-described example embodiments may also be described as in supplementary notes below, which is not limited thereto.

(Supplementary Note 1)

An imaging system comprising:
acquisition means for acquiring an iris image captured by iris imaging means for capturing an iris of a target person at a first angle of view or a whole image captured by whole imaging means for capturing the target person at a second angle of view wider than the iris imaging means;
estimation means for estimating a three-dimensional position of a target person being included in the acquired whole image;
selection means for selecting a coordinate transformation matrix that transforms a three-dimensional position of the target person into two-dimensional coordinates at the first angle of view;
transformation means for transforming coordinates of an eye of a target person being included in a whole image associated with the estimated three-dimensional position into two-dimensional coordinates at the first angle of view, based on the selected coordinate transformation matrix; and setting means for setting, based on the transformed coordinates of an eye of the target person, a parameter for capturing an image of an iris of the target person by the iris imaging means.

(Supplementary Note 2)

The imaging system according to Supplementary note 1, wherein the selection means selects a coordinate transformation matrix according to the estimated three-dimensional position from among a plurality of coordinate transformation matrices that transform two-dimensional coordinates at the second angle of view being prepared in association with a three-dimensional position of the target person into two-dimensional coordinates at the first angle of view.

(Supplementary Note 3)

The imaging system according to Supplementary note 1 or 2, wherein the setting means sets a region of interest (ROI) including an eye of the target person within the first angle of view, based on the transformed coordinates of an eye of the target person.

(Supplementary Note 4)

The imaging system according to any one of Supplementary notes 1 to 3, further comprising a plurality of iris imaging means as the iris imaging means,
wherein the setting means selects iris imaging means for capturing the target person from among the plurality of iris imaging means, based on the transformed coordinates of an eye of the target person.

(Supplementary Note 5)

The imaging system according to any one of Supplementary notes 1 to 4, wherein the setting means sets a focal position of the iris imaging means, based on the estimated three-dimensional position.

(Supplementary Note 6)

The imaging system according to Supplementary note 5, wherein the setting means sets a focus scanning range of the iris imaging means, based on the estimated three-dimensional position.

(Supplementary Note 7)

The imaging system according to Supplementary note 5 or 6, wherein the iris imaging means includes a variable focus lens, and the setting means sets a lens focus driving value of the variable focus lens, based on the estimated three-dimensional position.

(Supplementary Note 8)

The imaging system according to any one of Supplementary notes 1 to 7, wherein the estimation means estimates a three-dimensional position of the target person, based on a focal position focusing on the target person in the whole image.

(Supplementary Note 9) The imaging system according to Supplementary note 8, wherein the estimation means estimates a three-dimensional position of the target person, based on a focal position focusing on a region of a face of the target person in the whole image.

(Supplementary Note 10) The imaging system according to Supplementary note 8 or 9, wherein
the whole imaging means includes a variable focus lens, and
the estimation means estimates a three-dimensional position of the target person, based on a lens focus driving value of the variable focus lens in the focusing focal position.

(Supplementary Note 11)

The imaging system according to any one of Supplementary notes 1 to 7, further comprising a depth sensor configured to measure a depth from the whole imaging means or the iris imaging means to the target person,
wherein the estimation means estimates a three-dimensional position of the target person, based on a depth of the target person being measured by the depth sensor.

(Supplementary Note 12)

The imaging system according to any one of Supplementary notes 1 to 7, wherein
the whole imaging means is a stereo camera, and
the estimation means estimates a three-dimensional position of the target person, based on a depth of the target person being acquired from a whole image captured by the stereo camera.

(Supplementary Note 13)

The imaging system according to any one of Supplementary notes 1 to 7, further comprising a plurality of human detection sensors installed in association with the three-dimensional position,
wherein the estimation means estimates a three-dimensional position of the target person, based on a detection result of the target person by the plurality of human detection sensors.

(Supplementary Note 14)

An imaging method comprising:
acquiring an iris image captured by iris imaging means for capturing an iris of a target person at a first angle of view or a whole image captured by whole imaging means for capturing the target person at a second angle of view wider than the iris imaging means;
estimating a three-dimensional position of a target person being included in the acquired whole image;
selecting a coordinate transformation matrix that transforms a three-dimensional position of the target person into two-dimensional coordinates at the first angle of view;

transforming coordinates of an eye of a target person being included in a whole image associated with the estimated three-dimensional position into two-dimensional coordinates at the first angle of view, based on the selected coordinate transformation matrix; and setting, based on the transformed coordinates of an eye of the target person, a parameter for capturing an image of an iris of the target person by the iris imaging means.

(Supplementary Note 15)

The imaging method according to Supplementary note 14, wherein the setting further includes setting a region of interest (ROI) including an eye of the target person within the first angle of view, based on the transformed coordinates of an eye of the target person.

(Supplementary Note 16)

An imaging program for causing a computer to execute processing of:

acquiring an iris image captured by an iris imaging means for capturing an iris of a target person at a first angle of view or a whole image captured by a whole imaging means for capturing the target person at a second angle of view wider than the iris imaging means;

estimating a three-dimensional position of a target person being included in the acquired whole image;

selecting a coordinate transformation matrix according to the estimated three-dimensional position from among a plurality of coordinate transformation matrices that transform two-dimensional coordinates at the second angle of view being prepared in association with a three-dimensional position of the target person into two-dimensional coordinates at the first angle of view;

transforming two-dimensional coordinates of an eye of a target person being included in the whole image into two-dimensional coordinates at the first angle of view, based on the selected coordinate transformation matrix; and setting, based on the transformed coordinates of an eye of the target person, a parameter for capturing an image of an iris of the target person by the iris imaging means.

(Supplementary Note 17)

The imaging program according to Supplementary note 16, wherein the setting further includes setting a region of interest (ROI) including an eye of the target person within the first angle of view, based on the transformed coordinates of an eye of the target person.

REFERENCE SIGNS LIST

10 IMAGING SYSTEM
11 ACQUISITION UNIT
12 ESTIMATION UNIT
13 SELECTION UNIT
14 TRANSFORMATION UNIT
15 SETTING UNIT
20 COMPUTER
21 PROCESSOR
22 MEMORY
100 IMAGING SYSTEM
110 IRIS CAMERA
111 VARIABLE FOCUS LENS
120 WIDE FIELD OF VIEW CAMERA
121 VARIABLE FOCUS LENS
130 CONTROL DEVICE
131 WIDE FIELD OF VIEW IMAGE ACQUISITION UNIT
132 EYE DETECTION UNIT
133 COORDINATE TRANSFORMATION UNIT
134 IRIS CAMERA SETTING UNIT
135 LENS FOCUS CONTROL UNIT
136 IRIS IMAGE ACQUISITION UNIT
137 REGISTRATION AUTHENTICATION UNIT
138 DEPTH ESTIMATION UNIT
139 LENS CONTROL VALUE SELECTION UNIT
140 DEPTH SENSOR
150 DETECTION SENSOR
201 DATABASE
202 MATRIX STORAGE UNIT

What is claimed is:

1. An imaging system comprising:
a memory storing instructions; and
a processor configured to execute the instructions stored in the memory to:
acquire a whole image captured by a whole imaging unit capturing a target person at a second angle of view;
estimate a three-dimensional position of the target person being included in the acquired whole image;
store a plurality of coordinate transformation matrices that transform two-dimensional coordinates at the second angle of view into two-dimensional coordinates at a first angle of view at which a plurality of iris imaging units capture an iris image of an iris of the target person, the second angle of view wider than the first angle of view, the plurality of coordinate transformation matrices prepared in association with a three-dimensional position of the target person;
select a coordinate transformation matrix according to the estimated three-dimensional position from among the plurality of coordinate transformation matrices;
transform the two-dimensional coordinates of an eye of the target person being included in the whole image associated with the estimated three-dimensional position into the two-dimensional coordinates at the first angle of view, based on the selected coordinate transformation matrix;
set, based on the transformed two-dimensional coordinates of the eye of the target person, a parameter for capturing the iris image of the iris of the target person;
select an iris imaging unit for capturing the iris image of the iris of the target person from among the plurality of iris imaging units, based on the transformed two-dimensional coordinates of the eye of the target person;
cause the select iris imaging unit to capture the iris image of the iris of the target person in accordance with the set parameter; and
acquire the iris image as captured by the selected iris imaging unit.

2. The imaging system according to claim 1, wherein the processor is further configured to execute the instructions stored in the memory to set a region of interest (ROI) including the eye of the target person within the first angle of view, based on the transformed two-dimensional coordinates of the eye of the target person.

3. The imaging system according to claim 1, wherein the processor is further configured to execute the instructions stored in the memory to set a focal position of the selected iris imaging unit, based on the estimated three-dimensional position.

4. The imaging system according to claim 3, wherein the processor is further configured to execute the instructions stored in the memory to set a focus scanning range of the selected iris imaging unit, based on the estimated three-dimensional position.

5. The imaging system according to claim 3, wherein
the selected iris imaging unit includes a variable focus lens, and
the processor is further configured to execute the instructions stored in the memory to set a lens focus driving value of the variable focus lens, based on the estimated three-dimensional position.

6. The imaging system according to claim 1, wherein the processor is further configured to execute the instructions stored in the memory to estimate the three-dimensional position of the target person, based on a focal position focusing on the target person in the whole image.

7. The imaging system according to claim 6, wherein the processor is further configured to execute the instructions stored in the memory to estimate the three-dimensional position of the target person, based on the focal position focusing on a region of a face of the target person in the whole image.

8. The imaging system according to claim 6, wherein
the whole imaging unit includes a variable focus lens, and
the processor is further configured to execute the instructions stored in the memory to estimate the three-dimensional position of the target person, based on a lens focus driving value of the variable focus lens in the focusing focal position.

9. The imaging system according to claim 1, further comprising a depth sensor measuring a depth from the whole imaging unit or the plurality of iris imaging units to the target person,
wherein the processor is further configured to execute the instructions stored in the memory to estimate the three-dimensional position of the target person, based on a depth of the target person being measured by the depth sensor.

10. The imaging system according to claim 1, wherein
the whole imaging unit is a stereo camera, and
the processor is further configured to execute the instructions stored in the memory to estimate the three-dimensional position of the target person, based on a depth of the target person within the whole image captured by the stereo camera.

11. The imaging system according to claim 1, further comprising a plurality of human detection sensors installed in association with the three-dimensional position,
wherein the processor is further configured to execute the instructions stored in the memory to estimate the three-dimensional position of the target person, based on a detection result of the target person by the plurality of human detection sensors.

12. An imaging method performed by a computer and comprising:
acquiring a whole image captured by a whole imaging unit capturing a target person at a second angle of view;
estimating a three-dimensional position of the target person included in the acquired whole image;
storing a plurality of coordinate transformation matrices that transform two-dimensional coordinates at the second angle of view into two-dimensional coordinates at a first angle of view at which a plurality of iris imaging units capture an iris image of an iris of the target person, the second angle of view wider than the first angle of view, the plurality of coordinate transformation matrices prepared in association with a three-dimensional position of the target person;
selecting a coordinate transformation matrix according to the estimated three-dimensional position from among the plurality of coordinate transformation matrices;
transforming the two-dimensional coordinates of an eye of the target person included in the whole image associated with the estimated three-dimensional position into the two-dimensional coordinates at the first angle of view, based on the selected coordinate transformation matrix;
setting, based on the transformed two-dimensional coordinates of the eye of the target person, a parameter for capturing the iris image of the iris of the target person;
selecting an iris imaging unit for capturing the iris image of the iris of the target person from among the plurality of iris imaging units, based on the transformed two-dimensional coordinates of the eye of the target person;
causing the select iris imaging unit to capture the iris image of the iris of the target person in accordance with the set parameter; and
acquiring the iris image as captured by the selected iris imaging unit.

13. The imaging method according to claim 12, further comprising setting a region of interest (ROI) including the eye of the target person within the first angle of view, based on the transformed two-dimensional coordinates of the eye of the target person.

14. A non-transitory computer-readable medium storing an imaging program executable by a computer to execute perform processing comprising
acquiring a whole image captured by a whole imaging unit capturing a target person at a second angle of view;
estimating a three-dimensional position of the target person included in the acquired whole image;
storing a plurality of coordinate transformation matrices that transform two-dimensional coordinates at the second angle of view into two-dimensional coordinates at a first angle of view at which a plurality of iris imaging units capture an iris image of an iris of the target person, the second angle of view wider than the first angle of view, the plurality of coordinate transformation matrices prepared in association with a three-dimensional position of the target person;
selecting a coordinate transformation matrix according to the estimated three-dimensional position from among the plurality of coordinate transformation matrices;
transforming the two-dimensional coordinates of an eye of the target person included in the whole image associated with the estimated three-dimensional position into the two-dimensional coordinates at the first angle of view, based on the selected coordinate transformation matrix;
setting, based on the transformed two-dimensional coordinates of the eye of the target person, a parameter for capturing the iris image of the iris of the target person;
selecting an iris imaging unit for capturing the iris image of the iris of the target person from among the plurality of iris imaging units, based on the transformed two-dimensional coordinates of the eye of the target person;
causing the select iris imaging unit to capture the iris image of the iris of the target person in accordance with the set parameter; and
acquiring the iris image as captured by the selected iris imaging unit.

15. The non-transitory computer-readable medium according to claim 14, wherein the processing further comprises setting a region of interest (ROI) including the eye of the target person within the first angle of view, based on the transformed two-dimensional coordinates of the eye of the target person.

* * * * *